(12) United States Patent
Imber et al.

(10) Patent No.: US 11,593,626 B2
(45) Date of Patent: Feb. 28, 2023

(54) HISTOGRAM-BASED PER-LAYER DATA FORMAT SELECTION FOR HARDWARE IMPLEMENTATION OF DEEP NEURAL NETWORK

(71) Applicant: Imagination Technologies Limited, Kings Langley (GB)

(72) Inventors: James Imber, Hemel Hempstead (GB); Cagatay Dikici, London (GB)

(73) Assignee: Imagination Technologies Limited, Kings Langley (GB)

(*) Notice: Subject to any disclaimer, the term of this patent is extended or adjusted under 35 U.S.C. 154(b) by 1041 days.

(21) Appl. No.: 16/180,536

(22) Filed: Nov. 5, 2018

(65) Prior Publication Data
US 2019/0228293 A1    Jul. 25, 2019

(30) Foreign Application Priority Data

Nov. 3, 2017 (GB) ...................... 1718293

(51) Int. Cl.
*G06N 3/063* (2006.01)
*G06F 7/499* (2006.01)
(Continued)

(52) U.S. Cl.
CPC ......... *G06N 3/063* (2013.01); *G06F 7/49915* (2013.01); *G06F 7/5443* (2013.01); *G06N 3/0454* (2013.01)

(58) Field of Classification Search
CPC .................................................... G06N 3/063
See application file for complete search history.

(56) References Cited

U.S. PATENT DOCUMENTS 10,621,486 B2    4/2020   Yao
10,802,992 B2    10/2020  Yu et al.
(Continued)

FOREIGN PATENT DOCUMENTS

WO    2016/182671 A1    11/2016

OTHER PUBLICATIONS

Gysel et al., "Hardware-Oriented Approximation of Convolutional Neural Networks," Cornell University Library, ICLR Apr. 2016, pp. 1-8.
(Continued)

*Primary Examiner* — Michael D. Yaary
(74) *Attorney, Agent, or Firm* — Potomac Law Group, PLLC; Vincent M DeLuca

(57) ABSTRACT

A histogram-based method of selecting a fixed point number format for representing a set of values input to, or output from, a layer of a Deep Neural Network (DNN). The method comprises obtaining a histogram that represents an expected distribution of the set of values of the layer, each bin of the histogram is associated with a frequency value and a representative value in a floating point number format; quantising the representative values according to each of a plurality of potential fixed point number formats; estimating, for each of the plurality of potential fixed point number formats, the total quantisation error based on the frequency values of the histogram and a distance value for each bin that is based on the quantisation of the representative value for that bin; and selecting the fixed point number format associated with the smallest estimated total quantisation error as the optimum fixed point number format for representing the set of values of the layer.

19 Claims, 19 Drawing Sheets

(51) Int. Cl.
  *G06F 7/544* (2006.01)
  *G06N 3/04* (2006.01)

(56) References Cited

U.S. PATENT DOCUMENTS

| | | | |
|---|---|---|---|
| 11,392,823 | B2 | 7/2022 | Imber |
| 2016/0328646 | A1 | 11/2016 | Lin et al. |
| 2017/0024642 | A1 | 1/2017 | Xiong et al. |
| 2017/0061279 | A1 | 3/2017 | Yang et al. |
| 2017/0140259 | A1 | 5/2017 | Bergstra |
| 2017/0220929 | A1 | 8/2017 | Rozen et al. |
| 2017/0367685 | A1 | 12/2017 | Zou et al. |
| 2018/0017925 | A1 | 1/2018 | Yoshimura et al. |
| 2018/0046896 | A1 | 2/2018 | Yu et al. |
| 2018/0107451 | A1 | 4/2018 | Harrer et al. |
| 2018/0181881 | A1 | 6/2018 | Du et al. |
| 2018/0211152 | A1 | 7/2018 | Migacz et al. |
| 2019/0034784 | A1 | 1/2019 | Li et al. |
| 2019/0122100 | A1* | 4/2019 | Kang .................. G06F 7/57 |

OTHER PUBLICATIONS

Lin et al., "Fixed Point Quantization of Deep Convolutional Networks," Proceeding ICML'16 Proceedings of the 33rd International Conference on International Conference on Machine Learning, vol. 48, pp. 2849-2858, New York, NY, USA—Jun. 19-24, 2016.

Moons et al., "Energy-Efficient ConvNets Through Approximate Computing," Cornell University Library, arXiv.org > cs > arXiv: 1603.06777, Mar. 22, 2016.

Lin et al; "Fixed Point Quantization of Deep Convolutional Networks"; Retrieved from the Internet: URL:https://arxiv.org/pdf/1511.06393v2.pdf; Jan. 7, 2016; pp. 1-15.

Qiu et al; "Going Deeper with Embedded FPGA Platform for Convolutional Neural Network"; Proceedings of the 2016 ACM/SIGDA International Symposium on Field-Programmable Gate Arrays; Jan. 1, 2016; pp. 26-35.

Anwar et al; "Fixed Point Optimization of Deep Convolutional Neural Networks for Object Recognition"; 2015 IEEE International Conference on Acoustics, Speech and Signal Processing (ICASSP); Apr. 1, 2015; pp. 1131-1135.

Judd et al; "Proteus: Exploiting precision variability in deep neural networks"; Parallel Computing; vol. 73; May 24, 2017; pp. 40-51.

Courbariaux, M et al.; "Training Deep Neural Networks with Low Precision Multiplications"; (Year:2015); pp. 10.

Gupta, S. et al., "Deep Learning with Limited Numerical Precision" (Year:2015); 10 pages.

Li, G et al., "On comparing three artificial neural networks for wind speed forecasting" (Year: 2010).

* cited by examiner

HISTOGRAM-BASED PER-LAYER DATA FORMAT SELECTION FOR HARDWARE IMPLEMENTATION OF DEEP NEURAL NETWORK

BACKGROUND

A Deep Neural Network (DNN) is a type of artificial neural network that can be used for machine learning applications. In particular, a DNN can be used in signal processing applications, including image processing and computer vision applications.

DNNs have been implemented in applications where power resources are not a significant factor. Despite this, DNNs have application in a number of different technical fields in which the resources of the hardware used to implement the DNNs is such that power consumption, processing capabilities, or silicon area are limited.

There is therefore a need to implement hardware that is configured to implement a DNN in an efficient manner, i.e. in a manner that requires less silicon area or less processing power when operating. Moreover, DNNs can be configured in a number of different ways for a variety of different applications. There is therefore also a need for hardware for implementing a DNN to be flexible to be able to support a variety of DNN configurations.

The embodiments described below are provided by way of example only and are not limiting of implementations which solve any or all of the disadvantages of known hardware implementations of deep neural networks.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein is a histogram-based method of selecting a fixed point number format for representing a set of values input to, or output from, a layer of a Deep Neural Network (DNN). The method comprises obtaining a histogram that represents an expected distribution of the set of values of the layer wherein each bin of the histogram is associated with a frequency value; quantising a representative value for each bin in a floating point number format according to each of a plurality of potential fixed point number formats; estimating, for each of the plurality of potential fixed point number formats, the total quantisation error introduced by the quantisation based on the frequency values of the histogram and a distance value for each bin that is based on the quantisation of the representatiave value for that bin; and selecting a fixed point number format for representing the set of values based on the total estimated quantisation errors.

A first aspect provides a computer-implemented method of identifying a fixed point number format for representing a set of values input to, or output from, a layer of a Deep Neural Network "DNN" for use in configuring a hardware implementation of the DNN, the method comprising: obtaining a histogram that represents an expected distribution of the set of values of the layer, wherein each bin of the histogram is associated with a frequency value; for each fixed point number format of a plurality of fixed point number formats: quantising a representative value in a floating point number format for each bin according to the fixed point number format; and estimating a total quantisation error associated with the fixed point number format based on the frequency values and a distance value for each bin that is based on the quantisation of the representative value for that bin; and selecting the fixed point number format of the plurality of fixed point number formats associated with the smallest estimated total quantisation error as the fixed point number format for representing the set of values of the layer.

A second aspect provides a computing-based device for identifying a fixed point number format for representing a set of values input to, or output from, a layer of a Deep Neural Network "DNN" for use in configuring a hardware implementation of the DNN, the computing-based device comprising: at least one processor; and memory coupled to the at least one processor, the memory comprising: a histogram that represents an expected distribution of the set of values of the layer, wherein each bin of the histogram is associated with a frequency value; and computer readable code that when executed by the at least one processor causes the at least one processor to: for each fixed point number format of a plurality of fixed point number formats: quantise a representative value in a floating point format for each bin according to the fixed point number format; and estimate a total quantisation error associated with the fixed point number format based on the frequency values and a distance value for each bin that is based on the quantisation of the representatiave value for that bin; and select the fixed point number format of the plurality of fixed point number formats associated with the smallest estimated total quantisation error as the fixed point number format for representing the set of values of the layer.

A third aspect provides a hardware implementation of a Deep Neural Network "DNN" comprising: hardware logic configured to: receive input data values to a layer of the DNN; receive information indicating a fixed point number format for the input data values of the layer, the fixed point number format for the input data values of the layer having been selected in accordance with the method of the first aspect; interpret the input data values based on the fixed point number format for the input data values of the layer; and process the interpreted input data values in accordance with the layer to generate output data values for the layer.

The hardware implementation of the DNN may be embodied in hardware on an integrated circuit. There may be provided a method of manufacturing, at an integrated circuit manufacturing system, the hardware implementation. There may be provided an integrated circuit definition dataset that, when processed in an integrated circuit manufacturing system, configures the system to manufacture the hardware implementation of the DNN. There may be provided a non-transitory computer readable storage medium having stored thereon a computer readable description of a hardware implementation of a DNN that, when processed in an integrated circuit manufacturing system, causes the integrated circuit manufacturing system to manufacture an integrated circuit embodying a hardware implementation of a DNN.

There may be provided an integrated circuit manufacturing system comprising: a non-transitory computer readable storage medium having stored thereon a computer readable description of the hardware implementation of the DNN; a layout processing system configured to process the computer readable description so as to generate a circuit layout description of an integrated circuit embodying the hardware implementation of the DNN; and an integrated circuit generation system configured to manufacture the hardware implementation of the DNN according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
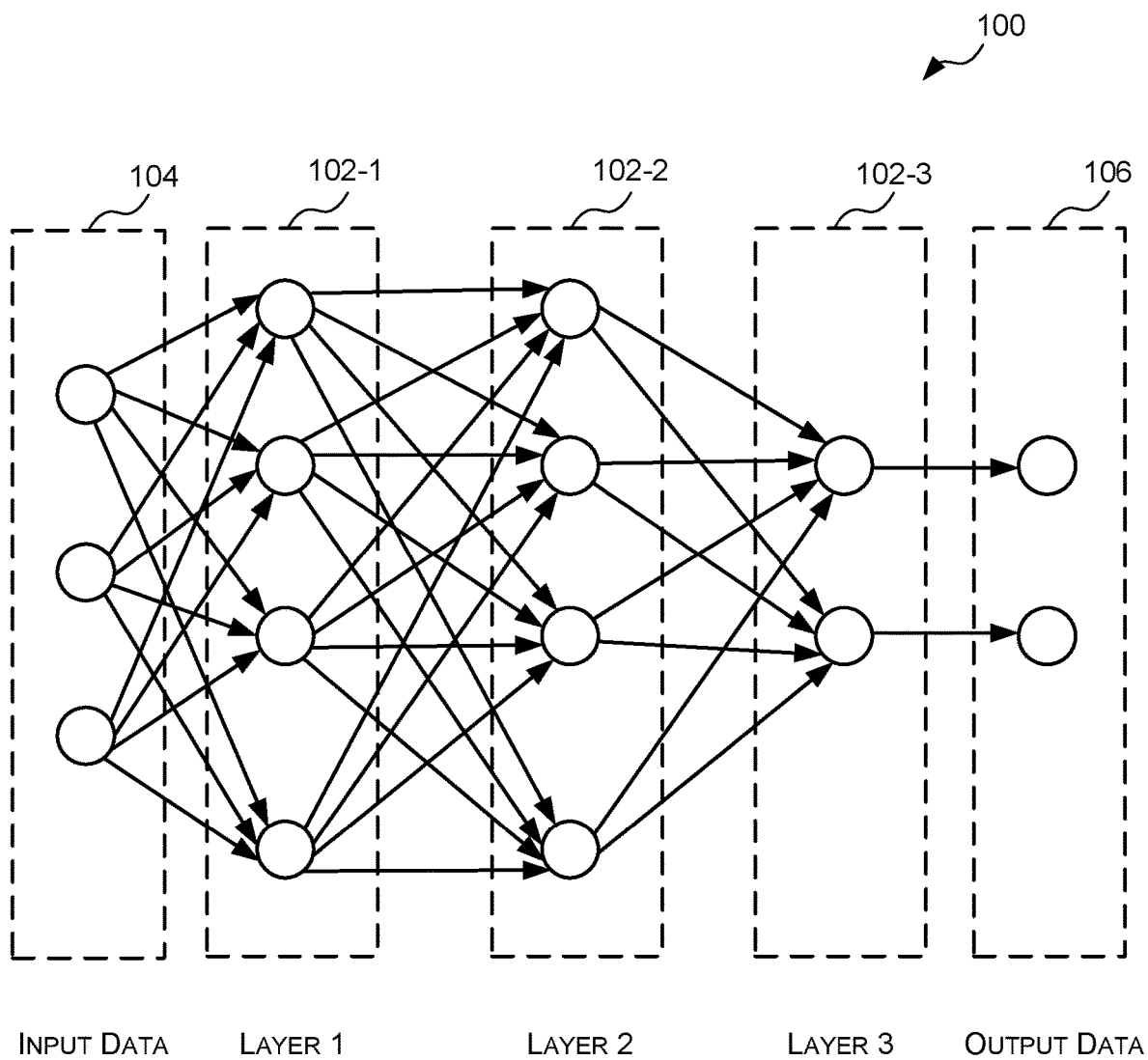
FIG. 1 is a schematic diagram of an example deep neural network (DNN)

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A Deep Neural Network (DNN) is a form of artificial neural network comprising a plurality of interconnected layers that enable the DNN to perform signal processing tasks, including, but not limited to, computer vision tasks. FIG. 1 illustrates an example DNN 100 that comprises a plurality of layers 102-1, 102-2, 102-3. Each layer 102-1, 102-2, 102-3 receives input data, processes the input data in accordance with the layer to produce output data. The output data is either provided to another layer as the input data, or is output as the final output data of the DNN. For example, in the DNN 100 FIG. 1 the first layer 102-1 receives the original input data 104 to the DNN 100 and processes the input data in accordance with the first layer 102-1 to produce output data. The output data of the first layer 102-1 becomes the input data to the second layer 102-2 which processes the input data in accordance with the second layer 102-2 to produce output data. The output data of the second layer 102-2 becomes the input data to the third layer 102-3 which processes the input data in accordance with the third layer 102-3 to produce output data. The output data of the third layer 102-3 is output as the output data 106 of the DNN.

The processing that is performed on the input data to a layer depends on the type of layer. For example, each layer of a DNN may be one of a plurality of different types. Example DNN layer types include, but are not limited to: a convolution layer, an activation layer, a normalisation layer, a pooling layer and a fully connected layer. It will be evident to a person of skill in the art that these are example DNN layer types and that this is not an exhaustive list and there may be other DNN layer types.

For a convolution layer, the input data is processed by convolving the input data using weights associated with that layer. Specifically, each convolution layer is associated with a plurality of weights $w_0 \ldots w_9$, which may also be referred to as filter weights or coefficients. The weights are grouped to form, or define, one or more filters, which may also be referred to as kernels, and each filter may be associated with an offset bias b.

Figure 2:
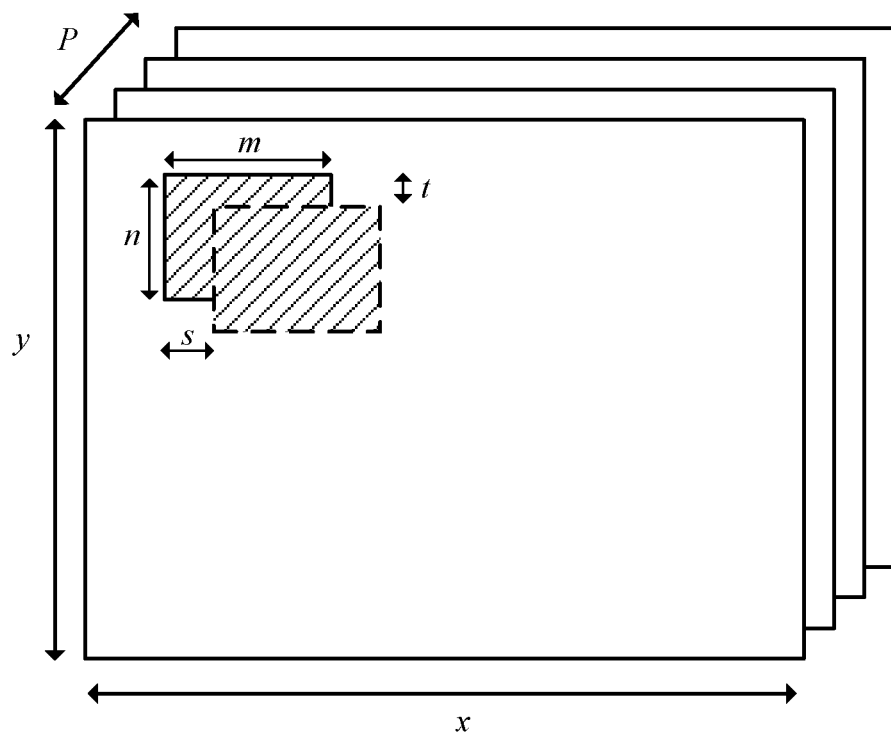
FIG. 2 is a schematic diagram of example data in a DNN.

Reference is made to FIG. 2 which illustrates an example overview of the format of data utilised in a DNN. As can be seen in FIG. 2, the data used in a DNN may be arranged as P planes of data, where each plane has a dimension x×y. A DNN may comprise one or more convolution layers each of which has associated therewith a plurality of filters each of which comprise a plurality of weights. Each filter has a dimension m×n×P (i.e. each filter comprises a set of m×n×P weights w) and is applied to the input data according to a convolution operation across several steps in direction s and t, as illustrated in FIG. 2. The number of filters and the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, performs one or more activation functions on the input data to the layer. An activation function takes a single number and performs a certain non-linear mathematical operation on it. In some examples, an activation layer may act as rectified linear unit (ReLU) by implementing an ReLU function (i.e. $f(x)=\max(0, x)$) or a Parametric Rectified Linear Unit (PReLU) by implementing a PReLU function.

A normalisation layer is configured to perform a normalizing function, such as a Local Response Normalisation (LRN) Function on the input data. A pooling layer, which is typically, but not necessarily inserted between successive convolution layers, performs a pooling function, such as a max or mean function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a three-dimensional set of input data values and outputs an N dimensional vector. Where the DNN is used for classification N is the number of classes and each value in the vector represents the probability of a certain class. The N dimensional vector is generated through a matrix multiplication of a set of weights, optionally followed by a bias offset. A fully connected layer thus receives a set of weights and/or a bias.

Figure 3:
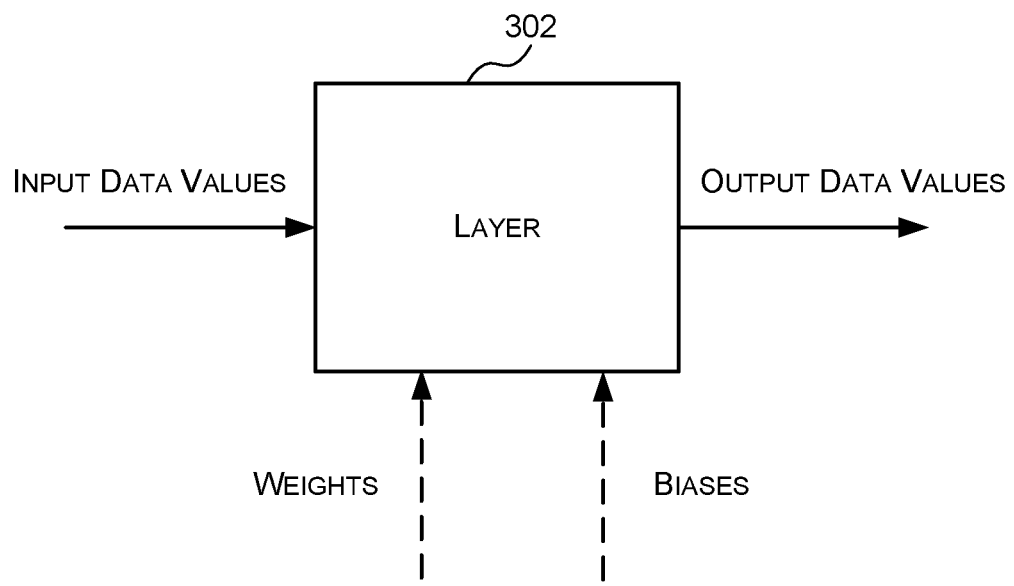
FIG. 3 is a schematic diagram illustrating the data input to, and output from, a layer of a DNN.

Accordingly, as shown in FIG. 3, each layer 302 of a DNN receives input data values and generates output data values; and some layers (such as convolution layers and fully-connected layers) also receive weights and/or biases.

A hardware implementation of a DNN comprises hardware logic configured to process input data to the DNN in accordance with the layers of the DNN. Specifically, a hardware implementation of a DNN comprises hardware logic configured to process the input data to each layer in accordance with that layer and generate output data for that layer which either becomes the input data to another layer or becomes the output of the DNN. For example, if a DNN comprises a convolution layer followed by an activation layer, the hardware implementation for that DNN comprises hardware logic configured to perform a convolution on the input data to the DNN using the weights and biases associated with that convolution layer to produce output data for the convolution layer, and hardware logic configured to apply an activation function to the input data to the activation layer (i.e. the output data of the convolution layer) to generate output data for the DNN.

As is known to those of skill in the art, for hardware to process a set of values each value is represented in a number format. The two most suitable number formats are fixed point number formats and floating point number formats. As is known to those skilled in the art, a fixed point number format has a fixed number of digits after the radix point (e.g. decimal point or binary point). In contrast, a floating point number format does not have a fixed radix point (i.e. it can "float"). In other words, the radix point can be placed anywhere within the representation. While representing values input to, and output from, the layers of a DNN in a floating point number format may allow more accurate or precise output data to be produced, processing numbers in a floating point number format in hardware is complex which tends to increase the silicon area and complexity of the hardware compared to hardware that processes values in fixed point number formats. Accordingly, hardware implementations may be configured to represent values input to, and/or output from, the layers of a DNN in a fixed point number format to reduce the area, power consumption and memory bandwidth of the hardware implementation.

A common fixed point number format is the Q format, which specifies a predetermined number of integer bits a and fractional bits b. Accordingly, a number can be represented as Qa.b which requires a total of a+b+1 bits (including the sign bit). Example Q formats are illustrated in Table 1 below.

TABLE 1

| Q Format | Description | Example |
|---|---|---|
| Q4.4 | 4 integer bits and 4 fractional bits | $0110.1110_2$ |
| Q0.8 | 0 integer bits and 8 fractional bits | $.01101110_2$ |

However, the Q format has a shortcoming in that some of the bits used to represent the number may be considered to be redundant. In an example, a number range [−0.125, 0.125) is to be represented to a precision of 3 bits. The required Q format for this example range and precision is Q0.5. However, if we assume that the range of values is known in advance, the first two bits of the number will never be used in determining the value represented in Q format. For example, the first two bits of the representation do not contribute to the final number since they represent 0.5 and 0.25 respectively and therefore fall outside of the required range. However, they are used to indicate the value of the third bit position (i.e. 0.125 and beyond due to the relative bit positions). Accordingly, the Q format described above is an inefficient fixed point number format for use within a hardware implementation of a DNN since some bits may not convey useful information.

Therefore, in some cases, instead of using the Q format, some hardware implementations may be configured to use a fixed point number format for values input to, or output from, the layers of a DNN wherein each value x is represented by a fixed integer exponent e and an n-bit mantissa m format $x=2^e m$ which is defined by the exponent e and the number n of mantissa bits $\{e, n\}$. In some cases, the mantissa m may be represented in two's complement format, and in other cases other signed or unsigned integer formats may be used.

To reduce the size, and increase the efficiency, of a hardware implementation of a DNN the hardware implementation may be configured to represent values input to, or output from, layers of a DNN in fixed point number formats that use the smallest number of bits that are able to represent the expected or desired range for each set of values. Since the range for different sets of values (e.g. input data values, output data values, biases and weights), may vary within a layer and between layers a hardware implementation may be able to process a DNN more efficiently if it can use fixed point number formats to represent the input data values, output data values, weights and/or biases, that can vary within a layer and between layers. For example, the hardware implementation may be able to implement the DNN more efficiently by using a fixed point number format comprising an exponent of 2 and a mantissa bit length of 6 to represent the input data values for a first layer, a fixed point number format comprising an exponent of 3 and a mantissa bit length of 12 to represent the weights of the first layer, and a fixed point number format comprising an exponent of 4 and a mantissa bit length of 6 to represent the input data values for a second layer. Accordingly, it is desirable to identify fixed point number formats (e.g. defined by an exponent and mantissa bit length) for representing sets of values input to, or output from, the layer of a DNN on a per layer basis to allow the hardware implementation to efficiently process that layer.

One simple method (which may be referred to herein as the full range method) for selecting a fixed point number format for representing a set of values input to, or output from, a layer of a DNN may comprise selecting, for a given mantissa bit depth n (or a given exponent e), the smallest exponent e (or smallest mantissa bit depth n) that covers the range for the expected set of values x for a layer. For example, for a given mantissa bit depth n, the exponent e can be chosen in accordance with equation (1) such that it covers the entire range of x where $\lceil \cdot \rceil$ is the ceiling function:

$$e = \lceil \log_2(\max(|x|)) \rceil - n + 1 \quad (1)$$

However, such a method is sensitive to outliers. Specifically, where the expected set of values x have outliers, precision is sacrificed to cover the outliers. This may result in large quantisation errors (i.e. the error between the set of values in a floating point number format and the set of values in the selected fixed point number format). As a consequence, the error in the output data of the layer and/or of the DNN caused by the quantisation, may be greater than if the fixed point number format covered a smaller range, but with more precision. As a result, the error in the output of the layer and/or of the DNN may be reduced by, instead of selecting a fixed point number format that covers the entire expected range for the set of values for a layer, selecting a fixed point number format that minimises the total error introduced by quantising the set of values.

Accordingly, described herein is a histogram-based method of selecting a fixed point number format for representing a set of values input to, or output from, a layer of a DNN based on an estimate of the total quantisation error associated with the potential fixed point number formats. Specifically, the method comprises obtaining a histogram that represents an expected distribution of the set of values of a layer of a DNN wherein each bin of the histogram is associated with a frequency value; quantising a representative value of each bin according to each of a plurality of potential fixed point number formats; estimating, for each of the plurality of potential fixed point number formats, the total quantisation error based on the frequency values of the histogram and a distance value for each bin that is based on the quantisation of the representative value for that bin; and selecting the fixed point number format associated with the smallest estimated total quantisation error as the optimum fixed point number format for representing the set of values of the layer. Minimising the quantisation error in this manner allows the trade-off between precision and range coverage to be resolved.

Once a fixed point number format has been selected for representing the set of values input to, or output from, a layer, the selected fixed point number format may be used to configure a hardware implementation of the DNN. For example, if the set of values is the input data values for a particular layer the selected fixed point number format may be used to configure a hardware implementation of the DNN to receive and process the input data values of the particular layer in the selected fixed point number format. Further examples of how a selected fixed point number format may be used to configure a hardware implementation of the DNN are described below.

As described in more detail below, the described method has been shown to select fixed point number formats for representing sets of values input to, or output from, layers of a DNN which when used to process those layers produces a more accurate output of the DNN over other methods, such as the full range method described above with respect to equation (1), of selecting fixed point number formats for representing sets of values for layers of a DNN. For example, where the DNN is used a classifier the DNN has shown to produce a more accurate classification when fixed point number formats for representing sets of values input to, or output from, layers of a DNN are selected in accordance with the described method. This is particularly true when the method is used to select an appropriate exponent of a fixed point number format with a low number of mantissa bits (e.g. less than 6 mantissa bits). The described method is also efficient in terms of computing power and time.

Figure 4:
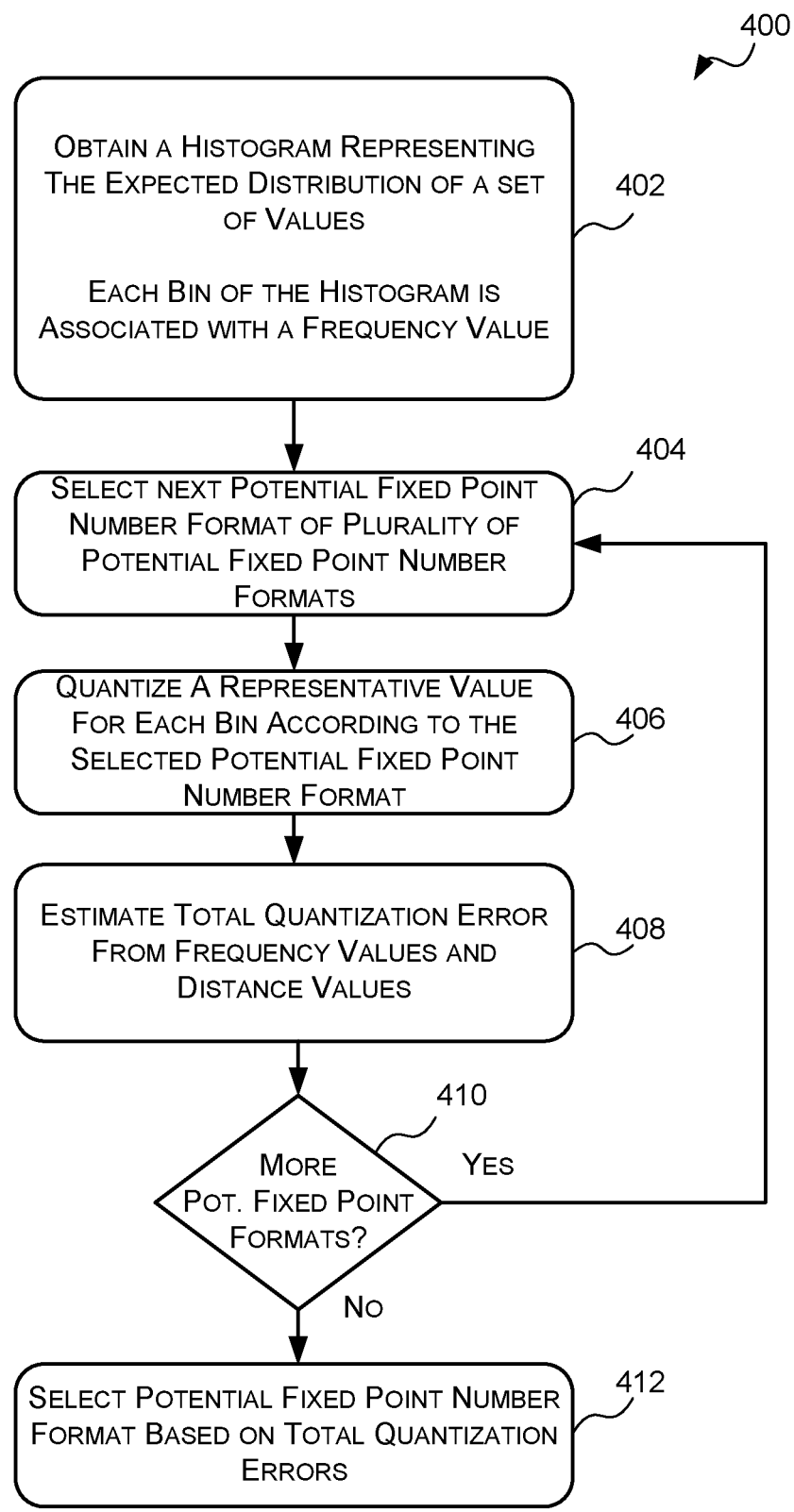
FIG. 4 is a flow diagram of an example histogram-based method of identifying an appropriate fixed point number format from a plurality of potential fixed point number formats for representing a set of values input to, or output from, a layer of a DNN.

Reference is now made to FIG. 4 which illustrates an example histogram-based method 400 for determining an appropriate fixed point number format for representing a set of values input to, or output from, a layer of a DNN which can be used to configure a hardware implementation of the DNN. The method 400 may be implemented by a computing-based device such as the computing-based device described below with respect to FIG. 17. For example, a computing-based device (e.g. computing-based device 1700) may include, or may have access to, computer readable medium (e.g. memory) that has computer readable instructions stored thereon, that when executed by a processor of the computing-based device, causes the computing-based device to execute the method 400 of FIG. 4.

The method begins at block 402, where a histogram that represents the expected distribution of a set of values (x) input to, or output from, a layer of a DNN is obtained. As described above with respect to FIG. 3 each layer 302 of a DNN may have multiple sets of data that are input to, or output from, that layer. For example, each layer may receive input data values and generate output data values; and some layers may also receive weights and/or biases. The set of values input to, or output from, a layer may be all or a portion of the input data values of the layer, all or a portion of the output data values of the layer, all or a portion of the weights of a layer, or all or a portion of the biases of the layer.

Figure 5:
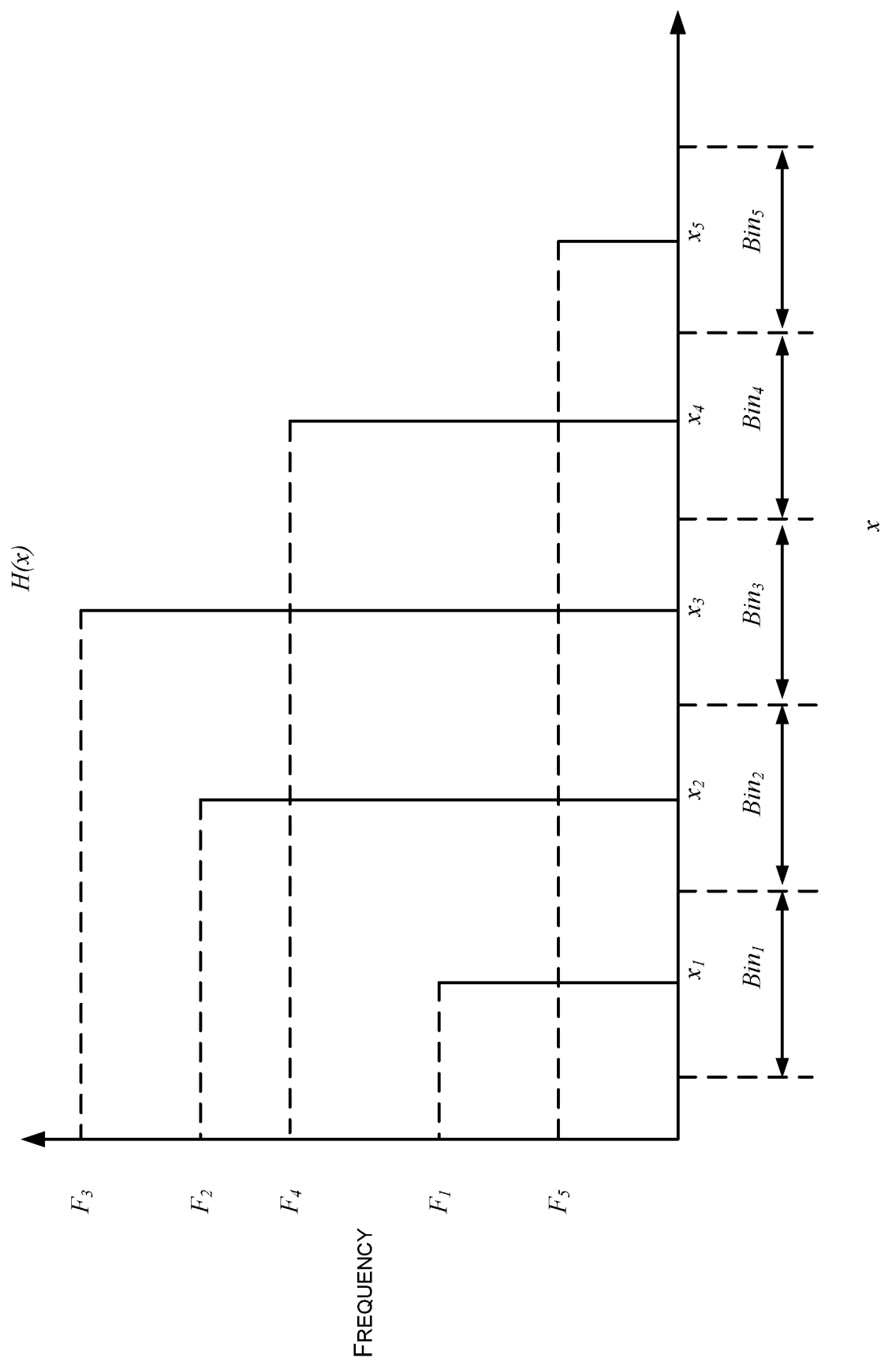
FIG. 5 is a schematic diagram of an example histogram.

A histogram that represents the expected distribution of a set of values is generated by dividing the range of expected values in the set into intervals or bins and counting how many of the expected values fall within each bin. In the embodiments described herein each bin ($Bin_i$) of the histogram H(x) is associated with a frequency value ($F_i$) indicating the expected number of values in the set that fall within that bin ($Bin_i$). For example, FIG. 5 illustrates an example histogram H(x) with fives bins ($Bin_1$, $Bin_2$, $Bin_3$, $Bin_4$, $Bin_5$) wherein each bin is associated with a frequency value ($F_1$, $F_2$, $F_3$, $F_4$ and $F_5$).

Preferably the density of the bins is at least as high as the maximum density of the quantisation levels of the plurality of potential fixed point number formats. For example, a fixed point number format with a mantissa bit length of 4 has 16 quantisation levels thus preferably there are at least 16 bins. Similarly, a fixed point number format with a mantissa bit length of 8 has 256 quantisation levels thus preferably there are at least 256 bins. The computation time to determine the total quantisation error increases with the number of bins, so there is a trade-off between computation time and accuracy. Testing has shown that good results can be achieved with roughly 1000 bins.

The actual set of input data values for a layer of a DNN will typically vary based on the input to the DNN and often cannot be precisely known in advance. However, an expected range and distribution of input data values within that range may be determined by, for example, running a training set of data or a known sample of typical input data sets through the DNN, recording the input data values to each layer which can be used to generate the histogram of the expected input data values for a layer. An expected range and distribution of output data values for a layer may be determined in a similar manner.

In contrast, the actual set of weights and biases for a layer are typically determined in advance during training of the DNN. Accordingly, the histogram of the weights or biases for a layer can be generated directly from the actual set of weights or biases which will be used for a layer.

Once a histogram (H(x)) representing the expected distribution for the set of values for the layer has been obtained, the method 400 proceeds to block 404.

At block 404, a potential fixed point number format of a plurality of potential fixed point number formats is selected for analysis. The plurality of potential fixed point number formats comprises a plurality of different fixed point number formats which may be used to represent the set of values of the layer.

In some cases, each potential fixed point number format is defined by, or comprises, an exponent e and a mantissa bit length n. In some cases, the method 400 may be used to identify an optimal exponent e for a particular mantissa bit length n. In these cases, each of the plurality of potential floating point number formats may comprise the same mantissa bit length n, but different exponents e. In other cases, the method 400 may be used to identify an optimal mantissa bit length n for a particular exponent e. In these cases, each of the plurality of potential fixed point number formats may comprise the same exponent e, but different mantissa bit lengths n.

In some cases, the plurality of potential fixed point number formats may comprise all possible fixed point number formats. For example, where the exponent is fixed, the plurality of potential fixed point number formats may comprise a potential fixed point number format for each possible mantissa bit length n in combination with the fixed exponent e. In other cases, the plurality of potential fixed point number formats may comprise a subset of all possible fixed point number formats. The subset may include, for example, the possible fixed point number formats that are more likely to be the optimal fixed point number format based on one or more criteria. For example, where the mantissa bit length is fixed, the plurality of potential fixed point number formats may comprise potential fixed point number formats that comprise the particular mantissa bit length n in combination with only a subset of possible exponents e. Once a potential fixed point number format has been selected the method proceeds to block 406.

At block 406, a representative value ($x_i$) for each bin of the histogram H(x) is quantised according to the potential fixed point number format selected in block 404. By only quantising one value per bin (as opposed to quantising all of the values that fall within the bin) the method 400 can be performed efficiently.

The representative value ($x_i$) of a bin is a value that falls within the bin. In some cases, as shown in FIG. 5, the representative value ($x_i$) of each bin may be the centre of the bin. Testing has shown that the centre value of the bin is a good representative of the values in the bin. However, in other cases, the representative value ($x_i$) may be another value that falls within the bin.

The representative value ($x_i$) for each bin is in a floating point number format. As described above, where a fixed point number format has a fixed number of digits after the radix point (e.g. decimal point or binary point), a floating point number representation does not have a fixed radix point (i.e. it can "float"). In other words, the radix point can be placed anywhere within the representation.

The most common floating point number format is the Institute of Electrical and Electronics Engineers (IEEE) standard for floating-point arithmetic (IEEE-754). IEEE-754 specifies that floating point numbers are represented by three numbers: sign, exponent and mantissa (s, exp, mant). In general, the three numbers (s, exp, mant) are interpreted, for a fixed integer bias, as shown in equation (2):

$$(-1)^s 2^{exp-bias} 1.\text{mant} \qquad (2)$$

IEEE-754 defines the four basic formats shown in Table 2 for floating point numbers with varying degrees of precision. In particular, they are encoded with 16, 32, 64 and 128 bits respectively.

TABLE 2

| Type | Name | Sign Width | Exponent Width (ew) | Mantissa Width (mw) | Bias $2^{ew-1} - 1$ |
| --- | --- | --- | --- | --- | --- |
| Half | F16 | 1 | 5 | 10 | 15 |
| Single | F32 | 1 | 8 | 23 | 127 |
| Double | F64 | 1 | 11 | 52 | 1023 |
| Quad | F128 | 1 | 15 | 112 | 16383 |

The representative value may be in one of the IEEE floating point number formats or may be in another floating point number format.

As is known to those of skill in the art, quantisation is the process of converting a number from a higher precision format to a lower precision format. Quantising a number in a higher precision format generally comprises representing the number in the higher precision format using the "nearest" or "closest" representable number in the lower precision format wherein the "nearest" or "closest" representable number in the lower precision format is defined by a particular rounding mode (such as, but not limited to round to nearest (RTN), round to zero (RTZ), round to nearest even (RTE), round to positive infinity (RTP), and round to negative infinity (RTN)). For example, quantising the number 1.2 according to a 4-bit binary number format may comprise representing the number 1.2 with the binary number '0001' (which is "1" in decimal as 1 is the closest representable number in a 4-bit binary number format). The quantised version of a representative value ($x_i$) of a bin of the histogram (H(x)) according to a particular fixed point number format f is denoted herein as $Q(x_i, f)$. An example method for quantising a value in a floating point number format according to a fixed point number format is described in detail below. However, the representative values ($x_i$) for the bins of the histogram (H(x)) may be quantised according to the potential fixed point number format using any suitable method.

Once the representative value ($x_i$) for each bin of the histogram has been quantised according to the potential fixed point number format selected in block 404, the method 400 proceeds to block 408.

At block 408, the total quantisation error (T(f)) caused by quantising the set of values according to the potential fixed point number format (f) is estimated based on the frequency values ($F_i$) of the histogram (H(x)) and a distance value for each bin that is based on the quantisation of the representative value of that bin.

Specifically, the frequency values ($F_i$) of the histogram (H(x)) indicate how many values within the set fall within each bin. Accordingly, if the quantisation error of each value in the bin is approximated by a distance value that represents the difference between the representative value for that bin in the floating point format and the representative value for that bin in the potential fixed point number format (in other words the distance value represents the quantisation error of the representative value), the total quantisation error T(f) caused by quantising the set of values according to a potential fixed point number format (f) can be estimated by summing the product of the frequency value ($F_i$) for each bin and the distance value $E_Q(x_i, f)$ for each bin as shown in equation (3):

$$T(f) = \Sigma_i H(x_i) E_Q(x_i, f) \tag{3}$$

Minimising the quantisation error caused by quantising the set of values according to a fixed point number format will minimise the total quantisation error in the output of a layer. For example, for a convolution layer or a fully-connected layer which has a weight vector w of length k and an input data vector d of length k in floating point number formats and produces an output $a=w^T d$ where $E_q(w_k, f)$ is the distance value of a weight $w_k$ for a given fixed-point number format f defined by an exponent e and a mantissa bit length n (e.g. f={e, n}), and $E_q(d_k, f')$ is the distance value for an input data value $d_k$ for a given fixed-point number format f' defined by an exponent e' and a mantissa bit length n' (e.g. f'={e', n'}) then the total error (E) caused by the quantisation is given by equation (4):

$$E = \Sigma_k E_q(w_k, f) E_q(d_k, f') \tag{4}$$

Treating the weights w and input data values d as random variables (denoted by uppercase letters W, and D respectively), assuming that W is independent of D, and taking expectations then the error can be given by equation (5). It can be seen from equation (5) that the total quantisation error is proportional to the distance values associated with the weights $E_q(W,f)$ as shown in equation (6).

$$\varepsilon\{E\} = len(W)\varepsilon\{E_q(W,f)\}\varepsilon\{E_q(D,f')\} \tag{5}$$

$$\varepsilon\{E\} \propto \varepsilon\{E_q(W,f)\} \tag{6}$$

From equation (6) it can be seen that the total quantisation error can be minimised by minimising the distance value (and thus the quantisation error) associated with the weights. The same is true for the input data (i.e. the total quantisation error can be minimised by minimising the distance value (and thus the quantisation error) associated with the input data values. The total quantisation error associated with the weights is given in equation (7) wherein P(W) is the probability distribution function:

$$\varepsilon\{E_q(W,f)\} = \int_{-\infty}^{\infty} P(W) E_q(W,f) dW \tag{7}$$

Since it is well known that a histogram is an estimate of the probability distribution of a continuous variable, the histogram H can be substituted in for P, and the integral replaced with a summation over all bins in the histogram which produces equation (8):

$$\varepsilon\{E_q(W,f)\} = \Sigma_i H(x_i) E_Q(x_i, f) \tag{8}$$

Then if the number of mantissa bits is fixed, the optimum exponent e* of the format f={e, n} may be selected as the exponent e from a set of potential exponents that minimises the error of equation (8) which is expressed in equation (9):

$$e^* = \text{argmin}_e \varepsilon\{E_q(W, f)\} \approx \text{argmin}_e \sum_i H(x_i) E_Q(x_i, f) \tag{9}$$

Similarly, if the exponent e is fixed the optimum number of mantissa bits n* of the format f={e, n} may be selected as the number of mantissa bits n from a set of potential number of mantissa bits that minimises the error of equation (8) which is expressed in equation (10):

$$n^* = \text{argmin}_n \varepsilon\{E_q(W, f)\} \approx \text{argmin}_n \sum_i H(x_i) E_Q(x_i, f) \tag{10}$$

The distance value ($E_q(x_i, f)$) of a representative value ($x_i$) of a bin for a particular fixed point number format f may be calculated in any suitable manner that considers the distance the values in the set are moving from their original floating point number format when quantised. In some cases, the distance value ($E_q(x_i, f)$) of a representative value ($x_i$) of a bin of the histogram (H(x)) for a particular fixed point number format f may be calculated as simply the difference between the representative value in the floating point number format ($x_i$) and the quantised version of the representative value ($Q(x_i, f)$) (i.e. the representative value in the fixed point number format f as shown in equation (11):

$$E_q(x_i, f) = x_i - Q(x_i, f) \tag{11}$$

Figure 6:
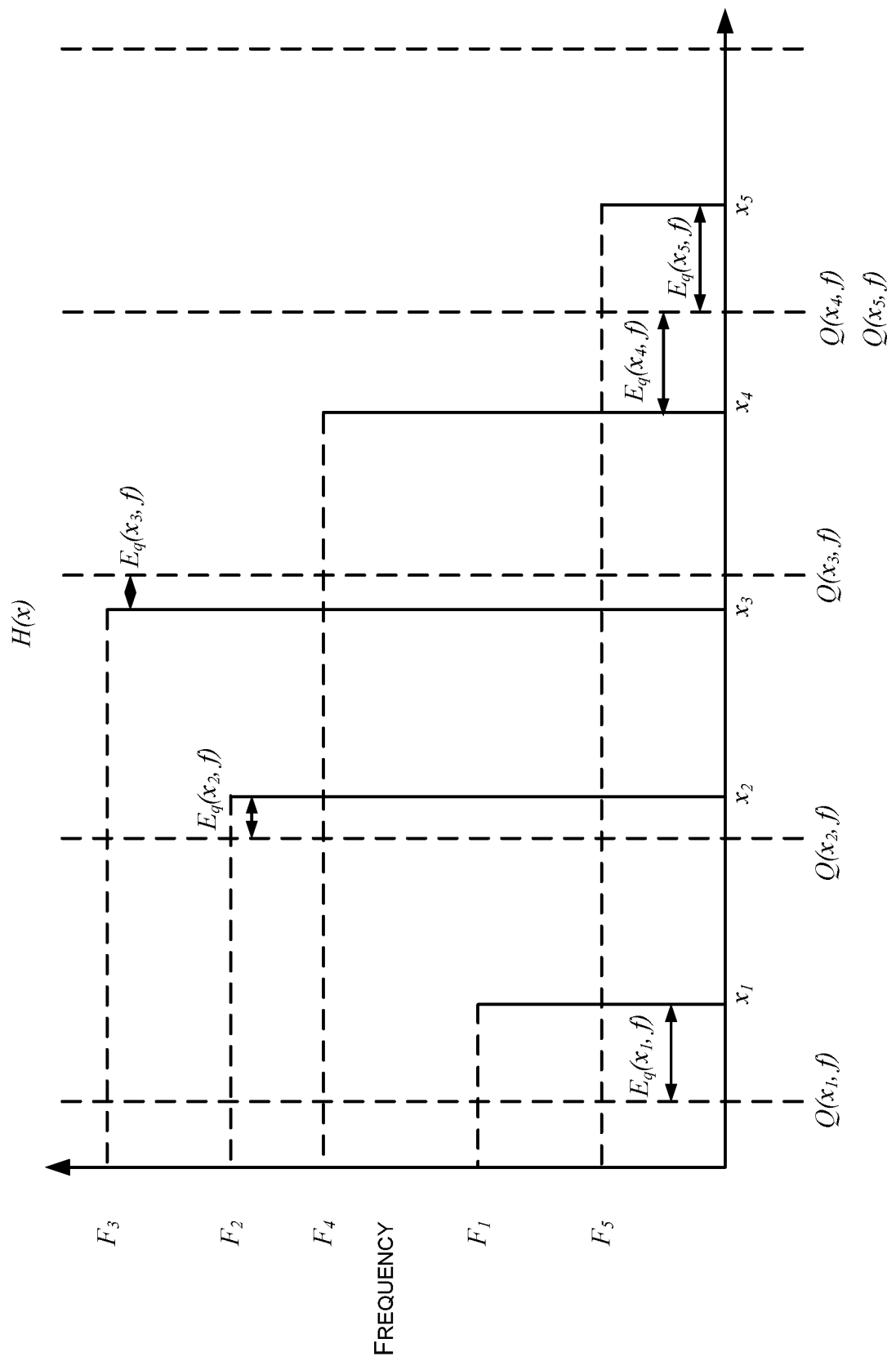
FIG. 6 is a schematic diagram of an example histogram wherein a representative value of each bin of the histogram has been quantised.

For example, as shown in FIG. 6, if the representative value $x_i$ for the first bin ($Bin_1$) of the histogram (H(x)) is quantised to $Q(x_1, f)$ then according to equation (11) the distance value $E_q(x_1, f)$ for the representative value $x_1$ is $x_1 - Q(x_i, f)$. Similarly, if the representative value $x_2$ for the second bin ($Bin_2$) of the histogram (H(x)) is quantised to $Q(x_2, f)$ then according to equation (11) the distance value $E_q(x_2, f)$ for the representative value $x_2$, is $x_2 - Q(x_2, f)$.

Testing has shown that the output error of some layers tends to have a Gaussian distribution. Since it is known that a sum of squares yields a more accurate estimate in the presence of Gaussian errors, a more accurate estimate of the total quantisation error may be determined when the distance value of a representative value is calculated as the squared difference between the representative value in a floating point number format and the quantised version of the representative value as shown in equation (12):

$$E_q(x_i,f)=(x_i-Q(x_i,f))^2 \quad (12)$$

In this case, the total quantisation error for a fixed point number format f for the example histogram H(x) of FIGS. 5 and 6 may be estimated as $(F_1*(x_1-Q(x_1, f))^2)+(F_2*(x_2-Q(x_2, f))^2)+(F_3*(x_3-(x_3, f))^2)+(F_4*(x_4-Q(x_4, f))^2)+(F_5*(x_5-Q(x_5, f))^2)$. Once the total quantisation error associated with the potential fixed point number format has been estimated the method 400 proceeds to block 410.

At block 410, a determination is made as to whether there are any other potential fixed point number formats for which an estimate of the total quantisation error has not been determined. If it is determined that there is at least one potential fixed point number format in the plurality of potential fixed point number formats for which an estimate of the total quantisation error has not been determined, then the method 400 returns to block 404. If, however, it is determined that an estimate of the total quantisation error has been determined for each of the plurality of potential fixed point number formats then the method 400 proceeds to block 412 where one of the potential fixed point number formats is selected as the desired or optimal fixed point number format to represent the set of values for the layer.

At block 412, one fixed point number format of the plurality of potential fixed point number formats is selected as the desired or optimum fixed point number format for representing the set of values of the layer based on the estimated total quantisation errors associated with the potential fixed point number formats. In some cases, the potential fixed point number format associated with the lowest estimated total quantisation error is selected as the fixed point number format for representing the set values of the layers. However, in other cases other criteria may be used to select one of the fixed point number formats.

Although in the example method 400 of FIG. 4 a single representative value for each bin is quantised according to each of the plurality of potential fixed point number formats, and the distance value of the quantised representative values is used to estimate the total quantisation error of each potential fixed point number format, in other examples, multiple representative values for one or more bins may be quantised. In these cases, a combination (e.g. an average or mean) of the distance values of the plurality of representative values for each of the one or more bins may be used to estimate the total quantisation error for each potential fixed point number format.

Once a fixed point number format for representing the set of values of a layer has been determined in accordance with the method 400 of FIG. 4 the identified fixed point number format may be used to configure a hardware implementation of a DNN. For example, the identified fixed point number format may be used to configure the DNN to expect to receive the input data values or weights in the identified format. This may allow the hardware implementation to more efficiently process the input data of that layer. In another example, the identified fixed point number format for a layer may be used to configure the DNN to, when it does not receive the input data values or weights for that layer in the identified fixed point number format, convert the received input data values or weights into the identified fixed point number format to allow the hardware implementation to more efficiently process the input data values or weights of that layer. In yet another example, the identified fixed point number format may be used to configure the hardware implementation to convert the output data of another layer that feeds into that layer into the identified fixed point number format so that it will be provided to that layer in the identified fixed point number format. An example hardware implementation of a DNN and how the identified formats may be used to configure the hardware implementation are described below with reference to FIG. 16.

The method 400 of FIG. 4 may be used to determine an appropriate fixed point number format for representing any set of values input to, or output from, any layer of a DNN. For example, the method 400 of FIG. 4 may be used to determine an appropriate fixed point number format for representing the input data values, output data values, weights or biases of any layer of a DNN. The method 400 may identify a different fixed point number format for the same type of values for different layers. For example, the method 400 may identify one fixed point number format for representing the input data values of one layer and a different fixed point number format for representing the input data values of another layer.

In some cases, a hardware implementation of a DNN may be able to support different fixed point number formats for different portions of the input data values, output data values, weights and/or biases of a layer. For example, the weights of a layer are divided into filters and the hardware implementation may be able to use a different fixed point number format for different filters or different groups of filters. In these cases, the method 400 may be used to identify an appropriate fixed point number format for representing a portion of the input data values, output data values, weights, or biases of a layer.

Outlier Weighting

It has been shown that in some cases, some values in a set (e.g. some input data values or some weights) may be more important than others. For example, in some convolution layers and some fully connected layers, weights with a large magnitude tend to correlate with key features, and weights with a small magnitude tend to correlate with less important input data values. As a result, outliers may be more significant than lower magnitude weights or input data values and thus the quantisation errors of the outliers may have a larger impact on the total error of the layer or the DNN than quantisation errors of lower magnitude weights or input data values. Accordingly, in these cases, a more appropriate trade-off between accuracy and range may place more importance on the quantisation errors for representative values that are outliers (e.g. fall outside the representable range of the fixed point number format) than the quantisation errors for representative values that are not outliers (e.g. fall within the representable range of the fixed point number format). Such a trade-off may be attained by applying a weighting to the quantisation errors of the representative values wherein the errors associated with the representative values that fall outside of the range of values representable by a particular fixed point number format are given a higher weighting than the quantisation errors associated with the representative values that fall within the range of values representable by a particular fixed point number format. This encourages the optimisation algorithm to increase the range to cover more outliers.

Accordingly in some cases, the distance value for a representative value of a bin for a particular fixed point number format f may be calculated as the product of the squared error (as described above with respect to equation (12)) and a weight a(x,f) associated with that representative value as shown in equation (13), wherein a lower weight is given to representative values that fall within the representable range of the fixed point number format and a higher weight is given to the representative values that fall outside the representable range of the fixed point number format, wherein $X_{max}$ is the largest representable number in the fixed point number format, $X_{min}$ is the smallest representable number in the fixed point number format, and a is a predetermined value:

$$E_q(x_i, f) = \alpha(x, f)(x_i - Q(x_i, f))^2 \qquad (13)$$

$$\alpha(x, f) = \begin{cases} > a, & x < X_{max} \text{ or } x > X_{min} \\ \leq a, & \text{otherwise} \end{cases}$$

Any weighting function a(x,f) in which a higher weight is given to the representative values that fall outside the representable range of the fixed point data format (defined by $X_{max}$ and $X_{min}$) relative to the weights given to the representative values that fall within the representable range of the fixed point number format may be used. A representative value may be said to fall within the representable range of the fixed point number format if the representative value falls between the maximum and minimum representable numbers in that fixed point number format.

Figure 7:
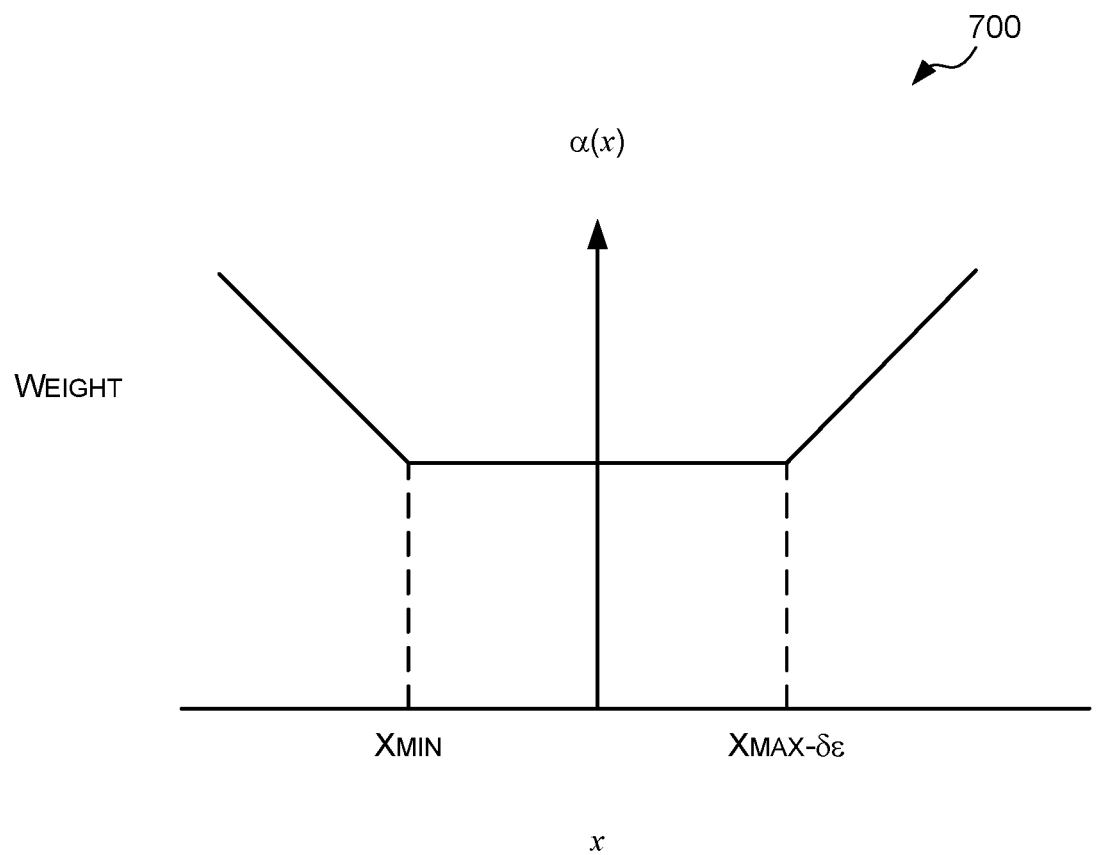
FIG. 7 is a schematic diagram of an example weighting function.

Testing has shown that in some cases a weighting function that applies a constant weight to the representative values that fall within the representable range of the fixed point number format and a linearly increasing weight to the representative values that fall outside the representable range of the fixed point number format is effective. An example of such a weighting function is shown in the graph 700 of FIG. 7 and is represented in equation (14) wherein $\delta_e$ is the distance between quantisation levels of the potential fixed point number format f and c and γ are constants which may be determined empirically:

$$\alpha(x, f) = \begin{cases} c + \dfrac{\gamma x}{X_{max} - \delta_e}, & x > X_{max} - \delta_e \\ c + \dfrac{\gamma |x|}{X_{max}}, & x < X_{min} \\ 1, & \text{otherwise} \end{cases} \qquad (14)$$

Testing has shown that γ=20 works well in some cases. The constant c is chosen to ensure continuity between the quantised values in the set (i.e. the values that fall within the representable range for the fixed point number format) and the saturated values in the set (i.e. the values that fall outside the representable range for the fixed point number format). Testing has shown that c=1−γ works well. It will be evident to a person of skill in the art that these are example values only for the constants and that other values may be used.

Floating Point Number Format to Fixed Point Number Format Conversion

As described above, at block 406 of method 400 of FIG. 4, the representative input values ($x_i$) of the bins of the histogram (H(x)) are quantised from a floating point number format to the potential fixed point number format. Equation (15) sets out an example formula for quantising a value in a floating point number format $x_i$ into a value in a fixed point number format Q ($x_i$, f) where $X_{max}$ is the highest representable number in the fixed point number format, $X_{min}$ is the lowest representable number in the fixed point number format, and RND($x_i$) is a rounding function:

$$Q(x_i, f) = \begin{cases} X_{max}, & \text{if } x_i \geq X_{max} \\ X_{min}, & \text{if } x_i \leq X_{min} \\ 0, & \text{if } x_i = 0 \\ RND(x_i), & \text{otherwise} \end{cases} \qquad (15)$$

The formula set out in equation (15) quantises an input data value or a weight in a floating point number format to the nearest available representable number in the fixed point number format where the "nearest" available representable number is determined based on the rounding function RND. The rounding function RND may be, for example, one of round towards zero (RTZ), and round towards nearest, ties to even (RTE). Since the representative value in the fixed point number format may have reduced precision with respect to the original floating point number format quantisation error may arise.

Test Results

Reference is now made to FIGS. 8 to 15 which illustrate the classification accuracy of an example DNN when the exponents for the weights of different layers are selected according to different methods including the full range method described above with respect to equation, a full-range −1 method, the method as described above with respect to FIG. 4 where the distance value is calculated as the squared error, and the method as described above with respect to FIG. 4 where the distance value is calculated as the product of a weight and the squared error.

Figure 8:
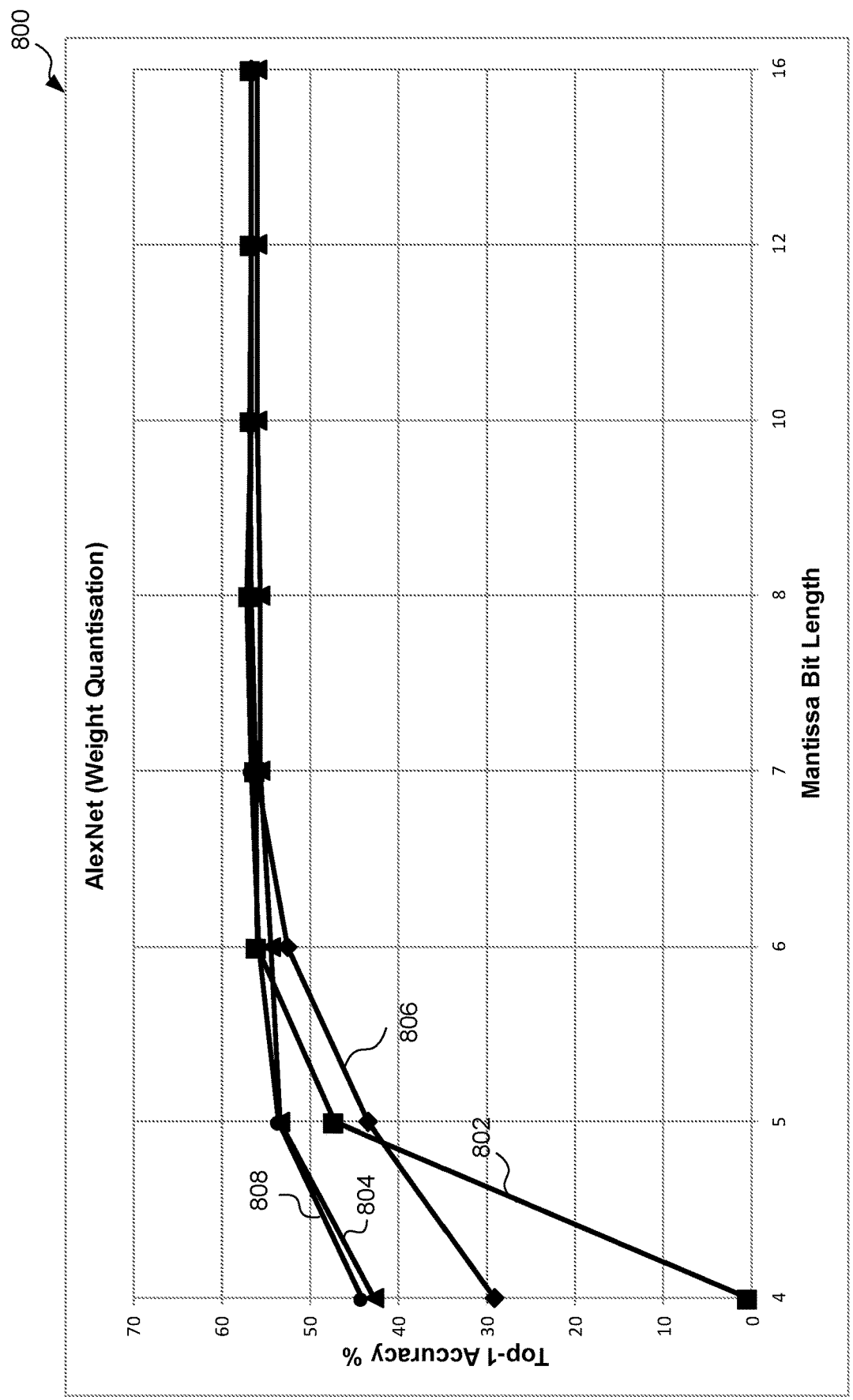
FIG. 8 is a graph of mantissa bit length versus Top-1 classification accuracy for an AlexNet DNN with an ImageNet validation dataset wherein the exponent for the weights is selected in accordance with a number of different methods.
Figure 9:
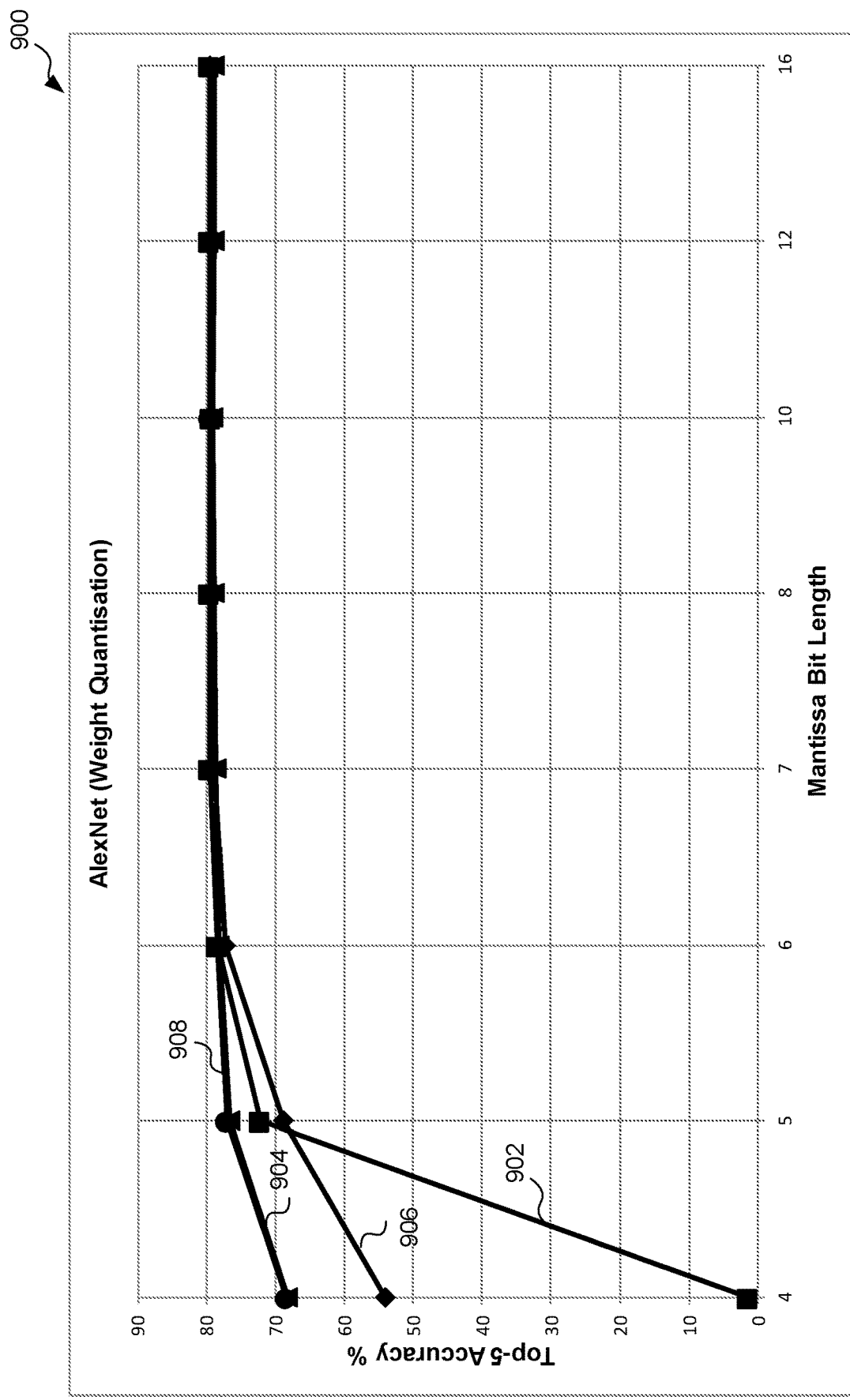
FIG. 9 is a graph of mantissa bit length versus Top-5 classification accuracy for an AlexNet DNN with an ImageNet validation dataset wherein the exponent for the weights is selected in accordance with a number of different methods.

FIGS. 8 and 9 show graphs 800, 900 of the Top-1 and Top-5 classification accuracy respectively for an AlexNet DNN with the ImageNet validation data set when the weights of each layer are represented in a fixed point number format wherein the mantissa bit length is fixed, and the exponent is selected in accordance with each of the methods. In particular, curves 802 and 902 show the Top-1/Top-5 classification accuracy of an AlexNet DNN when the exponents for the weights of each layer are selected using the full range method described above with respect to equation (1); curves 804 and 904 show the Top-1/Top-5 classification accuracy of an AlexNet DNN when the exponents for the weights of each layer are selected using the full range method described above with respect to equation (1) and reduced by 1; curves 806 and 906 show the Top-1/Top-5 classification accuracy of an AlexNet DNN when the exponents for the weights of each layer are selected using the method 400 of FIG. 4 and the distance value is calculated as the squared error (e.g. the distance value is calculated in accordance with equation (12)); and curves 808 and 908 show the Top-1/Top-5 classification accuracy of an AlexNet DNN when the exponents for the weights of each layer are selected using the method 400 of FIG. 4 and the distance value is calculated as the product of a weight and the squared error (e.g. the distance value is calculated in accordance with equation (13)). As is known to those of skill the art the Top-1 classification accuracy is a measure of whether the top output of the DNN is the correct classification and a Top-5 classification accuracy is a measure of whether the correct classification is in the top-five outputs of the DNN.

Figure 10:
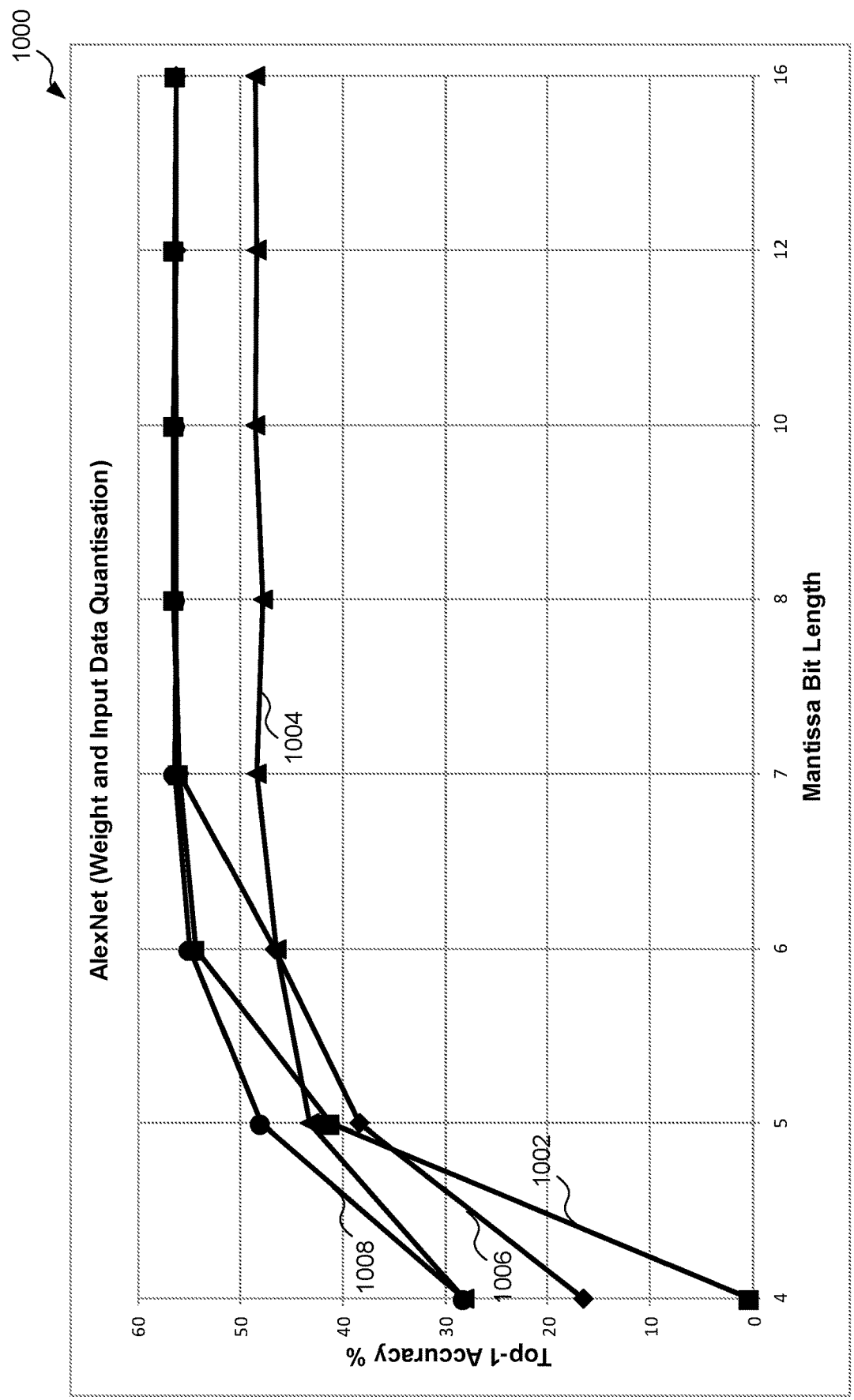
FIG. 10 is a graph of mantissa bit length versus Top-1 classification accuracy for an AlexNet DNN with an ImageNet validation dataset wherein the exponent for the weights and input data values are selected in accordance with a number of different methods.
Figure 11:
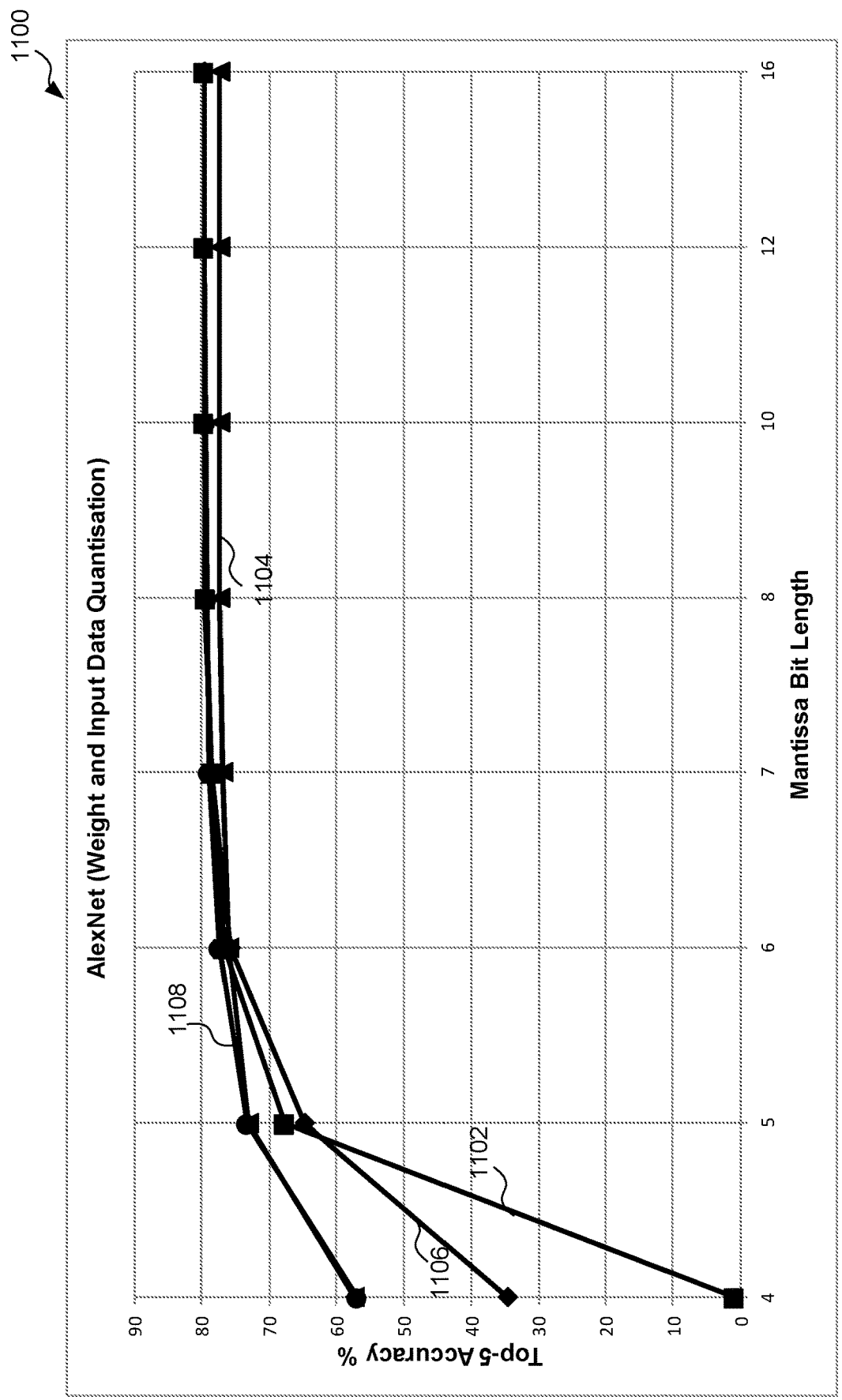
FIG. 11 is a graph of mantissa bit length versus Top-5 classification accuracy for an AlexNet DNN with an ImageNet validation dataset wherein the exponent for the weights and input data values are selected in accordance with a number of different methods.

FIGS. 10 and 11 show graphs 1000, 1100 of the Top-1 and Top-5 classification accuracy respectively for an AlexNet DNN when the weights and input data values of each layer are represented in a fixed point number format wherein the mantissa bit length is fixed, and the exponent is selected in accordance with each of the methods. In particular, curves 1002 and 1102 show the Top-1/Top-5 classification accuracy of an AlexNet DNN when the exponents for the weights and input data values of each layer are selected using the full range method described above with respect to equation (1); curves 1004 and 1104 show the Top-1/Top-5 classification accuracy of an AlexNet DNN when the exponents for the weights and input data values of each layer are selected using the full range method described above with respect to equation (1) and reduced by 1; curves 1006 and 1106 show the Top-1/Top-5 classification accuracy of an AlexNet DNN when the exponents for the weights and input data values are selected using the method 400 of FIG. 4 and the distance value is calculated as the squared error (e.g. the distance value is calculated in accordance with equation (12)); and curves 1008 and 1108 show the Top-1/Top-5 classification accuracy of an AlexNet DNN when the exponents are selected for the weights and input data values of each layer using the method 400 of FIG. 4 and the distance value is calculated as the product of a weight and the squared error (e.g. the distance value is calculated in accordance with equation (13)).

Figure 12:
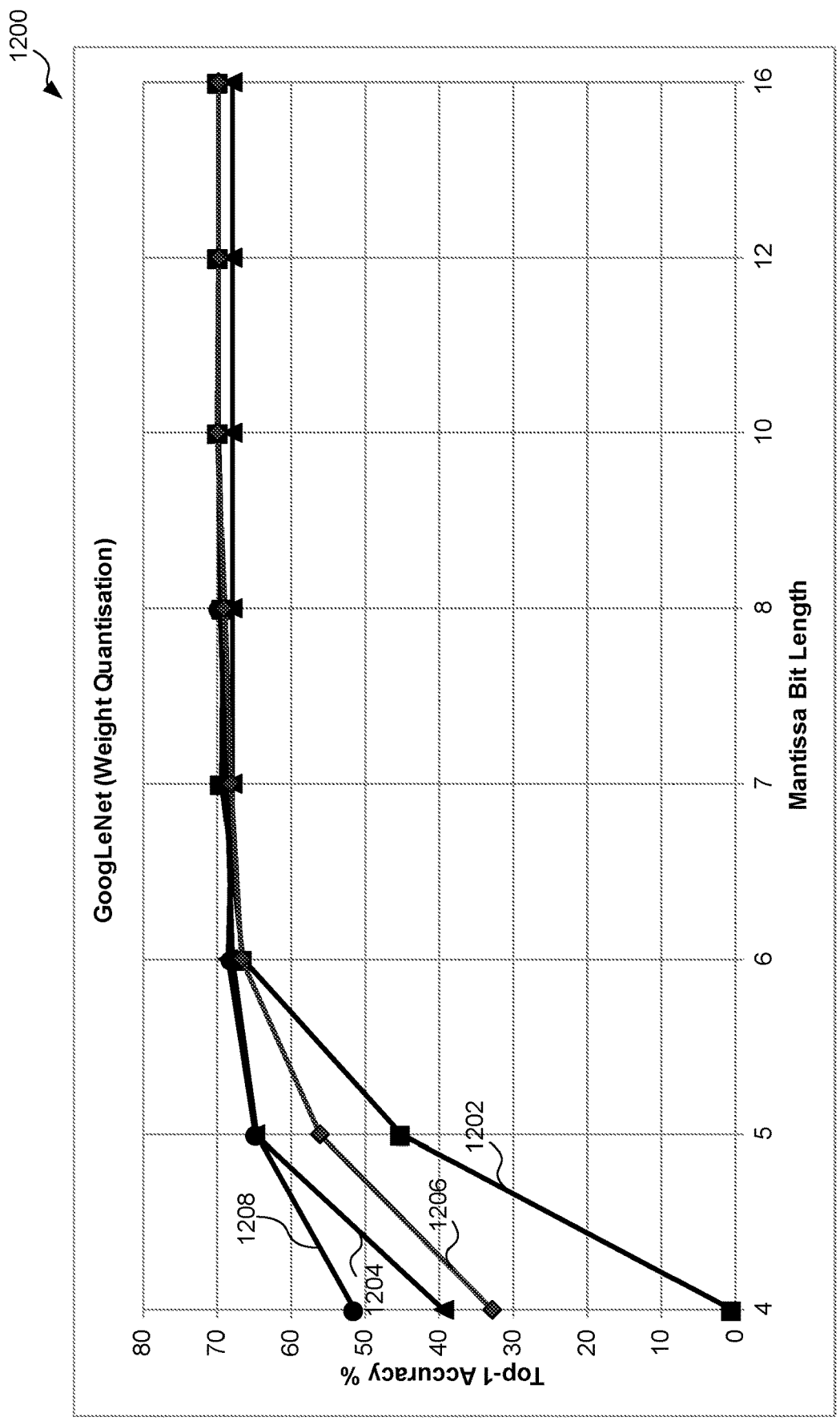
FIG. 12 is a graph of mantissa bit length versus Top-1 classification accuracy for a GoogLeNet DNN with an ImageNet validation dataset wherein the exponent for the weights is selected in accordance with a number of different methods.
Figure 13:
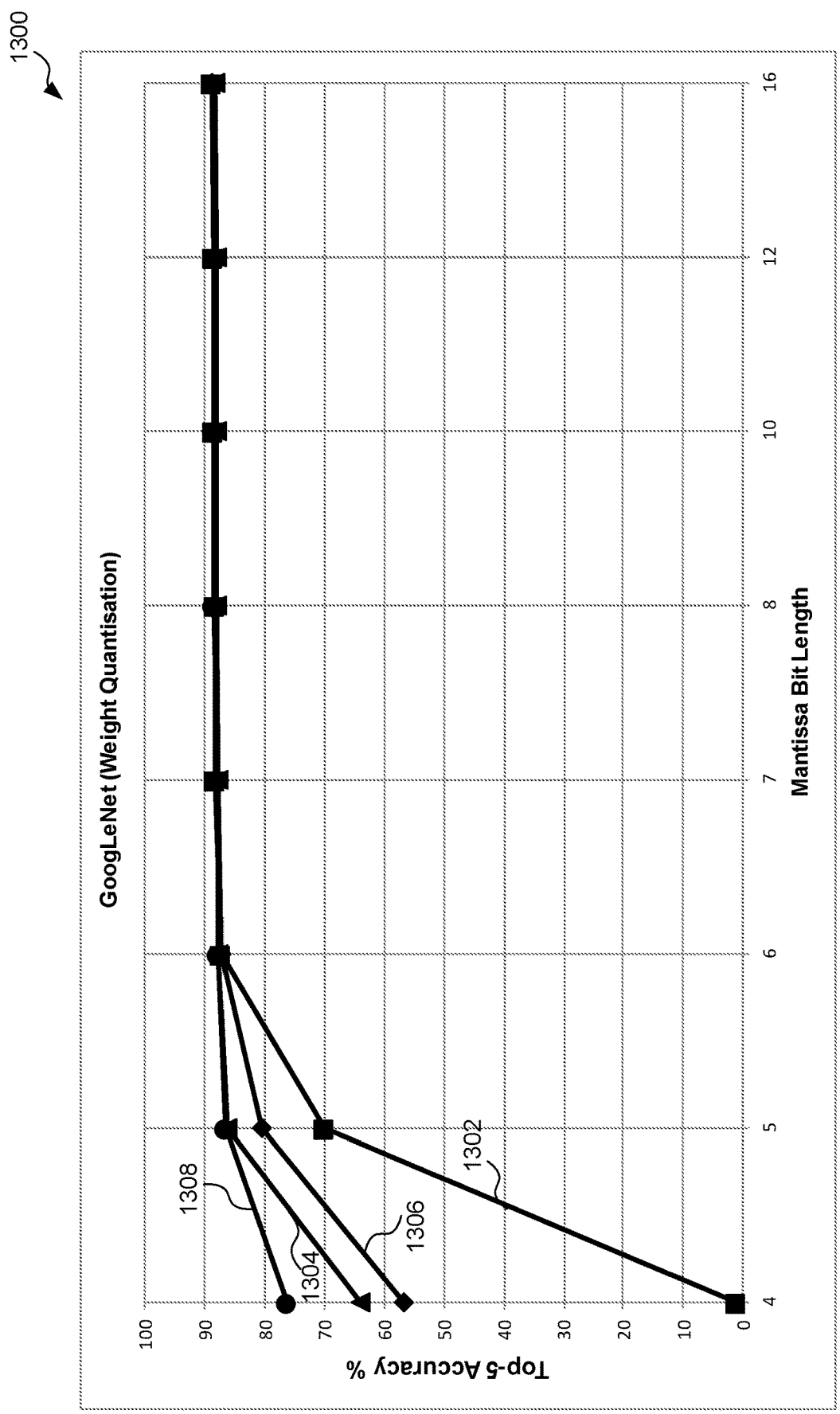
FIG. 13 is a graph of mantissa bit length versus Top-5 classification accuracy for a GoogLeNet DNN with an ImageNet validation dataset wherein the exponent for the weights is selected in accordance with a number of different methods.

FIGS. 12 and 13 show graphs 1200, 1300 of the Top-1 and Top-5 classification accuracy respectively for a GoogLeNet DNN with the ImageNet validation data set when the weights of each layer are represented in a fixed point number format wherein the mantissa bit length is fixed, and the exponent is selected in accordance with each of the methods. In particular, curves 1202 and 1302 show the Top-1/Top-5 classification accuracy of a GoogLeNet DNN when the exponents for the weights of each layer are selected using the full range method described above with respect to equation (1); curves 1204 and 1304 show the Top-1/Top-5 classification accuracy of a GoogLeNet DNN when the exponents for the weights of each layer are selected using the full range method described above with respect to equation (1) and reduced by 1; curves 1206 and 1306 show the Top-1/Top-5 classification accuracy of a GoogLeNet DNN when the exponents for the weights of each layer are selected using the method 400 of FIG. 4 and the distance value is calculated as the squared error (e.g. the distance value is calculated in accordance with equation (12)); and curves 1208 and 1308 show the Top-1/Top-5 classification accuracy of a GoogLeNet DNN when the exponents for the weights of each layer are selected using the method 400 of FIG. 4 and the distance value is calculated as the product of a weight and the squared error (e.g. the distance value is calculated in accordance with equation (13)).

Figure 14:
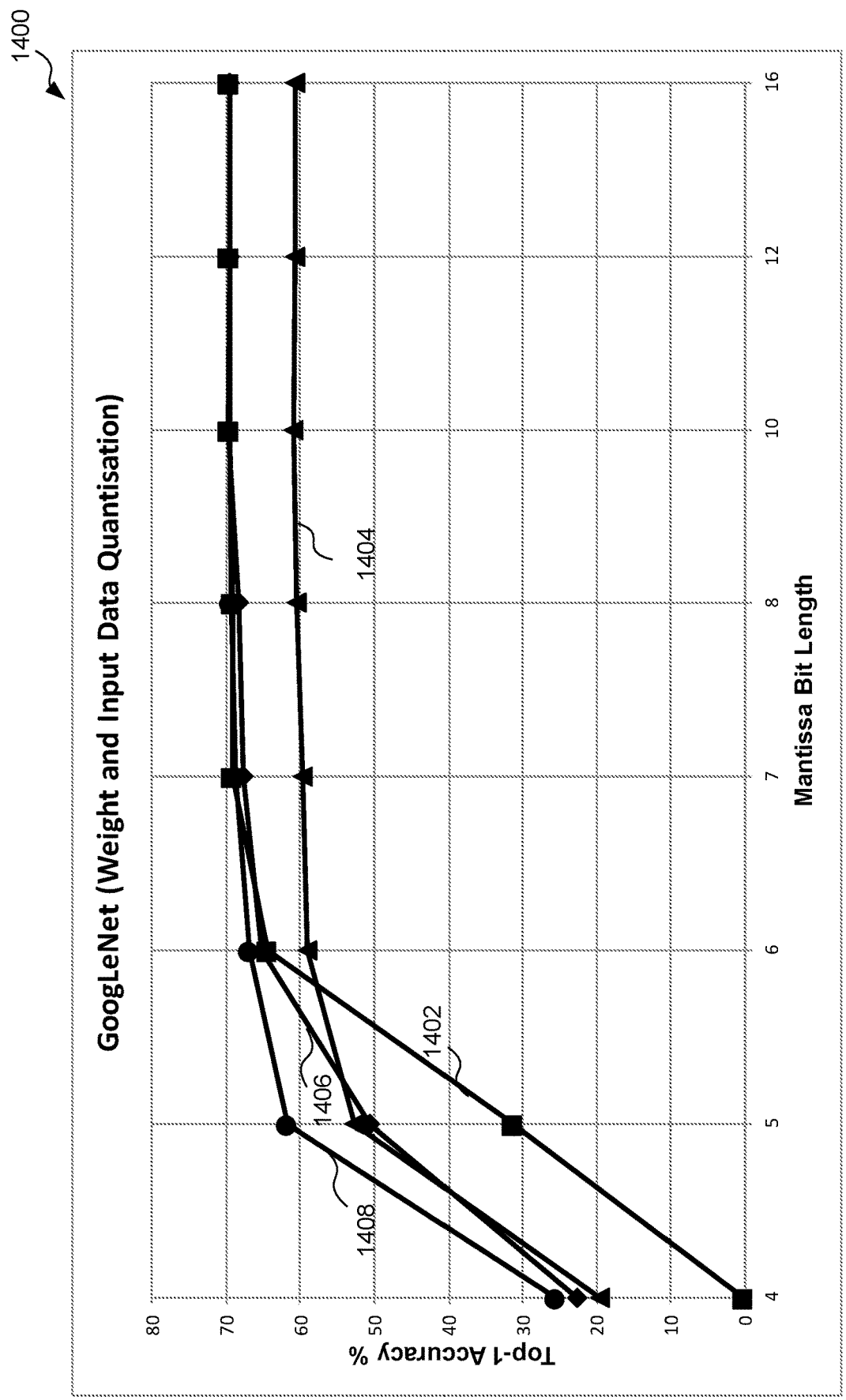
FIG. 14 is a graph of mantissa bit length versus Top-1 classification accuracy for a GoogLeNet DNN with an ImageNet validation dataset wherein the exponent for the weights and input data values are selected in accordance with a number of different methods.
Figure 15:
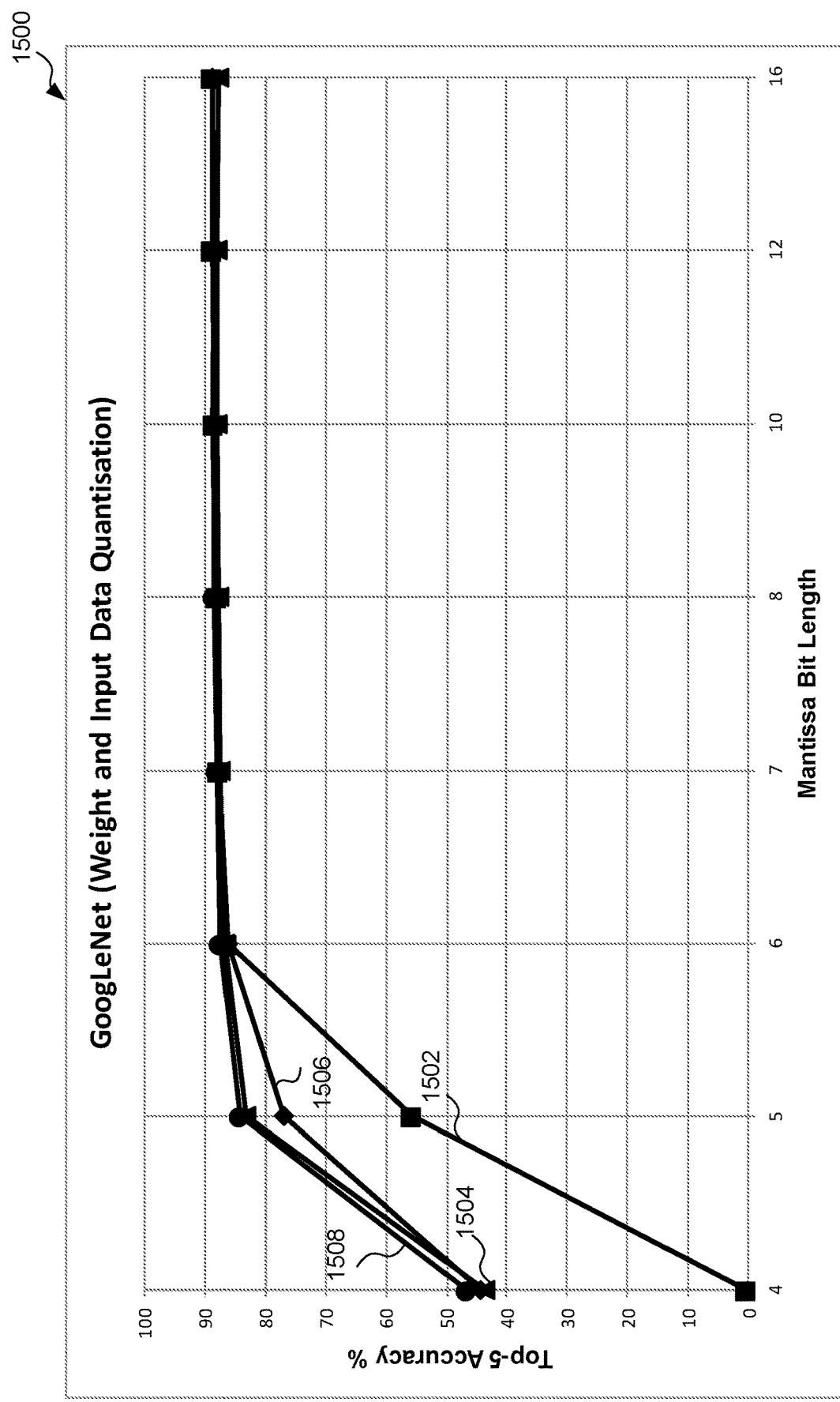
FIG. 15 is a graph of mantissa bit length versus Top-5 classification accuracy for a GoogLeNet DNN with an ImageNet validation dataset wherein the exponent for the weights and input data values are selected in accordance with a number of different methods.

FIGS. 14 and 15 show graphs 1400, 1500 of the Top-1 and Top-5 classification accuracy respectively for a GoogLeNet DNN when the weights and input data values of each layer are represented in a fixed point number format wherein the mantissa bit length is fixed, and the exponent is selected in accordance with each of the methods. In particular, curves 1402 and 1502 show the Top-1/Top-5 classification accuracy of a GoogLeNet DNN when the exponents for the weights and input data values of each layer are selected using the full range method described above with respect to equation (1); curves 1404 and 1504 show the Top-1/Top-5 classification accuracy of a GoogLeNet DNN when the exponents for the weights and input data values of each layer are selected using the full range method described above with respect to equation (1) and reduced by 1; curves 1406 and 1506 show the Top-1/Top-5 classification accuracy of a GoogLeNet DNN when the exponents for the weights and input data values are selected using the method 400 of FIG. 4 and the distance value is calculated as the squared error (e.g. the distance value is calculated in accordance with equation (12)); and curves 1408 and 1508 show the Top-1/Top-5 classification accuracy of a GoogLeNet DNN when the exponents are selected for the weights and input data values of each layer using the method 400 of FIG. 4 and the distance error is calculated as the product of a weight and the squared error (e.g. the distance value is calculated in accordance with equation (13)).

It can be seen from FIGS. 8-15 that the described histogram-based method selects fixed point number formats that improve the accuracy of the classification compared to selecting fixed point number formats using the full range method, particularly for small numbers (i.e. small mantissa bit lengths).

Example Hardware Implementation of a DNN

Figure 16:
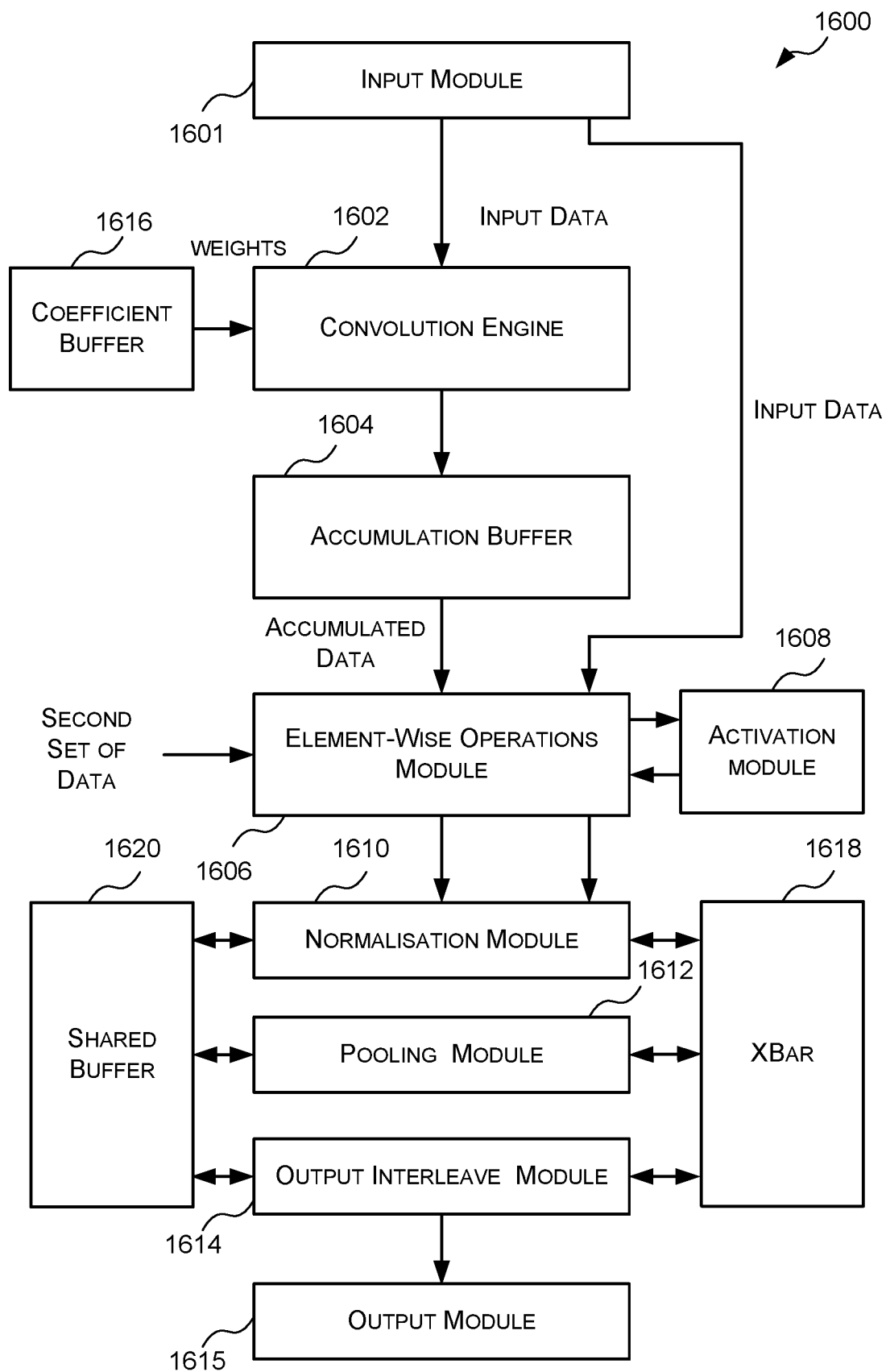
FIG. 16 is a block diagram of an example hardware implementation of a DNN.

Reference is now made to FIG. 16 which illustrates an example hardware implementation of a DNN 1600 which may be configured based on the formats identified using the method 400 of FIG. 4.

The hardware implementation 1600 of FIG. 16 is configured to compute the output of a DNN through a series of hardware passes (which also may be referred to as processing passes) wherein during each pass the hardware implementation receives at least a portion of the input data for a layer of the DNN and processes the received input data in accordance with that layer (and optionally in accordance with one or more following layers) to produce processed data. The processed data is either output to memory for use as input data for a subsequent hardware pass or output as the output of the DNN. The number of layers that the hardware implementation can process during a single hardware pass may be based on the size of the data, the hardware implementation and the order of the layers. For example, where the hardware implementation comprises hardware to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN.

The example hardware implementation 1600 of FIG. 16 comprises an input module 1601, a convolution engine 1602, an accumulation buffer 1604, an element-wise operations module 1606, an activation module 1608, a normalisation module 1610, a pooling module 1612, an output interleave module 1614 and an output module 1615. Each module or engine implements or processes all or a portion of one or more types of layers. Specifically, together the convolution engine 1602 and the accumulation buffer 1604 implement or process a convolution layer or a fully connected layer. The activation module 1608 processes or implements an activation layer. The normalisation module 1610 processes or implements a normalisation layer. The pooling module 1612 implements a pooling layer and the output interleave module 1614 processes or implements an interleave layer.

The input module 1601 is configured to receive the input data to be processed and provides it to a downstream module for processing.

The convolution engine 1602 is configured to perform a convolution operation on the received input data using the weights associated with a particular convolution layer. The weights for each convolution layer of the DNN may be stored in a coefficient buffer 1616 as shown in FIG. 16 and the weights for a particular convolution layer may be provided to the convolution engine 1602 when that particular convolution layer is being processed by the convolution engine 1602. Where the hardware implementation supports variable weight formats then the convolution engine 1602 may be configured to receive information indicating the format or formats of the weights of the current convolution layer being processed to allow the convolution engine to properly interpret and process the received weights.

The convolution engine 1602 may comprise a plurality of multipliers (e.g. 128) and a plurality of adders which add the result of the multipliers to produce a single sum. Although a single convolution engine 1602 is shown in FIG. 16, in other examples there may be multiple (e.g. 8) convolution engines so that multiple windows can be processed simultaneously. The output of the convolution engine 1602 is fed to the accumulation buffer 1604.

The accumulation buffer 1604 is configured to receive the output of the convolution engine and add it to the current contents of the accumulation buffer 1604. In this manner, the accumulation buffer 1604 accumulates the results of the convolution engine 1602. Although a single accumulation buffer 1604 is shown in FIG. 16, in other examples there may be multiple (e.g. 8, one per convolution engine) accumulation buffers. The accumulation buffer 1604 outputs the accumulated result to the element-wise operations module 1606 which may or may not operate on the accumulated result depending on whether an element-wise layer is to be processed during the current hardware pass.

The element-wise operations module 1606 is configured to receive either the input data for the current hardware pass (e.g. when a convolution layer is not processed in the current hardware pass) or the accumulated result from the accumulation buffer 1604 (e.g. when a convolution layer is processed in the current hardware pass). The element-wise operations module 1606 may either process the received input data or pass the received input data to another module (e.g. the activation module 1608 and/or or the normalisation module 1610) depending on whether an element-wise layer is processed in the current hardware pass and/or depending whether an activation layer is to be processed prior to an element-wise layer. When the element-wise operations module 1606 is configured to process the received input data the element-wise operations module 1606 performs an element-wise operation on the received data (optionally with another data set (which may be obtained from external memory)). The element-wise operations module 1606 may be configured to perform any suitable element-wise operation such as, but not limited to add, multiply, maximum, and minimum. The result of the element-wise operation is then provided to either the activation module 1608 or the normalisation module 1610 depending on whether an activation layer is to be processed subsequent the element-wise layer or not.

The activation module 1608 is configured to receive one of the following as input data: the original input to the hardware pass (via the element-wise operations module 1606) (e.g. when a convolution layer is not processed in the current hardware pass); the accumulated data (via the element-wise operations module 1606) (e.g. when a convolution layer is processed in the current hardware pass and either an element-wise layer is not processed in the current hardware pass or an element-wise layer is processed in the current hardware pass but follows an activation layer). The activation module 1608 is configured to apply an activation function to the input data and provide the output data back to the element-wise operations module 1606 where it is forwarded to the normalisation module 1610 directly or after the element-wise operations module 1606 processes it. In some cases, the activation function that is applied to the data received by the activation module 1608 may vary per activation layer. In these cases, information specifying one or more properties of an activation function to be applied for each activation layer may be stored (e.g. in memory) and the relevant information for the activation layer processed in a particular hardware pass may be provided to the activation module 1608 during that hardware pass.

In some cases, the activation module 1608 may be configured to store, in entries of a lookup table, data representing the activation function. In these cases, the input data may be used to lookup one or more entries in the lookup table and output values representing the output of the activation function. For example, the activation module 1608 may be configured to calculate the output value by interpolating between two or more entries read from the lookup table.

In some examples, the activation module 1608 may be configured to operate as a Rectified Linear Unit (ReLU) by implementing a ReLU function. In a ReLU function, the output element $y_{i,j,k}$ is calculated by identifying a maximum value as set out in equation (16) wherein for x values less than 0, y=0:

$$y_{i,j,k} = f(x_{i,j,k}) = \max\{0, x_{i,j,k}\} \quad (16)$$

In other examples, the activation module 1608 may be configured to operate as a Parametric Rectified Linear Unit (PReLU) by implementing a PReLU function. The PReLU function performs a similar operation to the ReLU function. Specifically, where $w_1, w_2, b_1, b_2 \in \mathbb{R}$ are constants, the PReLU is configured to generate an output element $y_{i,j,k}$ as set out in equation (17):

$$y_{i,j,k} = f(x_{i,j,k}; w_1, w_2, b_1, b_2) = \max\{(w_1 * x_{i,j,k} + b_1), (w_2 * x_{i,j,k} + b_2)\} \quad (17)$$

The normalisation module 1610 is configured to receive one of the following as input data: the original input data for the hardware pass (via the element-wise operations module 1606) (e.g. when a convolution layer is not processed in the current hardware pass and neither an element-wise layer nor an activation layer is processed in the current hardware pass); the accumulation output (via the element-wise operations module 1606) (e.g. when a convolution layer is processed in the current hardware pass and neither an element-wise layer nor an activation layer is processed in the current hardware pass); and the output data of the element-wise operations module and/or the activation module. The normalisation module 1610 then performs a normalisation function on the received input data to produce normalised data. In some cases, the normalisation module 1610 may be configured to perform a Local Response Normalisation (LRN) Function and/or a Local Contrast Normalisation (LCN) Function. However, it will be evident to a person of skill in the art that these are examples only and that the normalisation module 1610 may be configured to implement any suitable normalisation function or functions. Different normalisation layers may be configured to apply different normalisation functions.

The pooling module 1612 may receive the normalised data from the normalisation module 1610 or may receive the input data to the normalisation module 1610 via the normalisation module 1610. In some cases, data may be transferred between the normalisation module 1610 and the pooling module 1612 via an XBar 1618. The term "XBar" is used herein to refer to a simple hardware module that contains routing logic which connects multiple modules together in a dynamic fashion. In this example, the XBar may dynamically connect the normalisation module 1610, the pooling module 1612 and/or the output interleave module 1614 depending on which layers will be processed in the current hardware pass. Accordingly, the XBar may receive information each pass indicating which modules 1610, 1612, 1614 are to be connected.

The pooling module 1612 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave module 1614 may receive the normalised data from the normalisation module 1610, the input data to the normalisation function (via the normalisation module 1610), or the pooled data from the pooling module 1612. In some cases, the data may be transferred between the normalisation module 1610, the pooling module 1612 and the output interleave module 1614 via an XBar 1618. The output interleave module 1614 is configured to perform a rearrangement operation to produce data that is in a predetermined order. This may comprise sorting and/or transposing the received data. The data generated by the last of the layers is provided to the output module 1615 where it is converted to the desired output format for the current hardware pass.

The normalisation module 1610, the pooling module 1612, and the output interleave module 1614 may each have access to a shared buffer 1620 which can be used by these modules 1610, 1612 and 1614 to write data to and retrieve data from. For example, the shared buffer 1620 may be used by these modules 1610, 1612, 1614 to rearrange the order of the received data or the generated data. For example, one or more of these modules 1610, 1612, 1614 may be configured to write data to the shared buffer 1620 and read the same data out in a different order. In some cases, although each of the normalisation module 1610, the pooling module 1612 and the output interleave module 1614 have access to the shared buffer 1620, each of the normalisation module 1610, the pooling module 1612 and the output interleave module 1614 may be allotted a portion of the shared buffer 1620 which only they can access. In these cases, each of the normalisation module 1610, the pooling module 1612 and the output interleave module 1614 may only be able to read data out of the shared buffer 1620 that they have written in to the shared buffer 1620.

As described above the modules of the hardware implementation 1600 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the hardware implementation may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first convolution needs to be written out to memory before it can be used as an input to the second convolution. In each of these hardware passes only the modules, components or engines relevant to a convolution layer, such as the convolution engine 1602 and the accumulation buffer 1604, may be used or active.

Although the hardware implementation 1600 of FIG. 16 illustrates a particular order in which the modules, engines etc. are arranged and thus how the processing of data flows through the hardware implementation, it will be appreciated that this is an example only and that in other examples the modules, and engines may be arranged in a different manner. Furthermore, other hardware implementations may implement additional or alternative types of DNN layers and thus may comprise different modules, engines etc.

Figure 17:
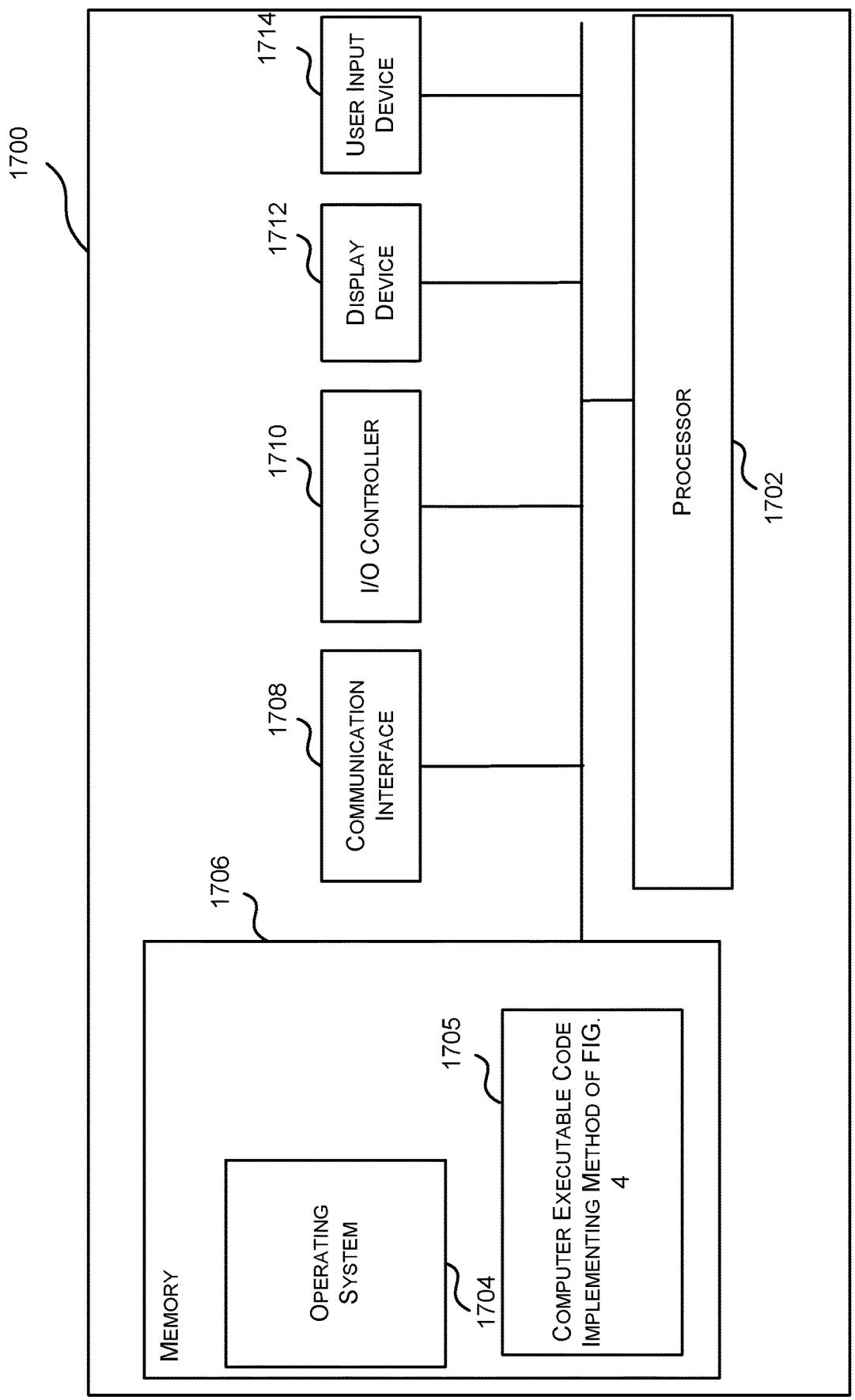
FIG. 17 is a block diagram of an example computing-based device.

FIG. 17 illustrates various components of an exemplary general purpose computing-based device 1700 which may be implemented as any form of a computing and/or electronic device, and in which embodiments of the method 400 described above may be implemented.

Computing-based device 1700 comprises one or more processors 1702 which may be microprocessors, controllers or any other suitable type of processors for processing computer executable instructions to control the operation of the device in order to assess the performance of an integrated circuit defined by a hardware design in completing a task. In some examples, for example where a system on a chip architecture is used, the processors 1702 may include one or more fixed function blocks (also referred to as accelerators) which implement a part of the method of determining the fixed point number format for representing a set of values input to, or output from, a layer of a DNN in hardware (rather than software or firmware). Platform software comprising an operating system 1704 or any other suitable platform software may be provided at the computing-based device to enable application software, such as computer executable code 1705 for implementing the method 400 of FIG. 3, to be executed on the device.

The computer executable instructions may be provided using any computer-readable media that is accessible by computing based device 1700. Computer-readable media may include, for example, computer storage media such as memory 1706 and communications media. Computer storage media (i.e. non-transitory machine readable media), such as memory 1706, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1706) is shown within the computing-based device 1700 it will be appreciated that the storage may be distributed or located remotely and accessed via a network or other communication link (e.g. using communication interface 1708).

The computing-based device 1700 also comprises an input/output controller 910 arranged to output display information to a display device 1712 which may be separate from or integral to the computing-based device 1700. The display information may provide a graphical user interface. The input/output controller 1710 is also arranged to receive and process input from one or more devices, such as a user input device 1714 (e.g. a mouse or a keyboard). In an embodiment the display device 1712 may also act as the user input device 1714 if it is a touch sensitive display device. The input/output controller 1710 may also output data to devices other than the display device, e.g. a locally connected printing device (not shown in FIG. 17).

Figure 18:
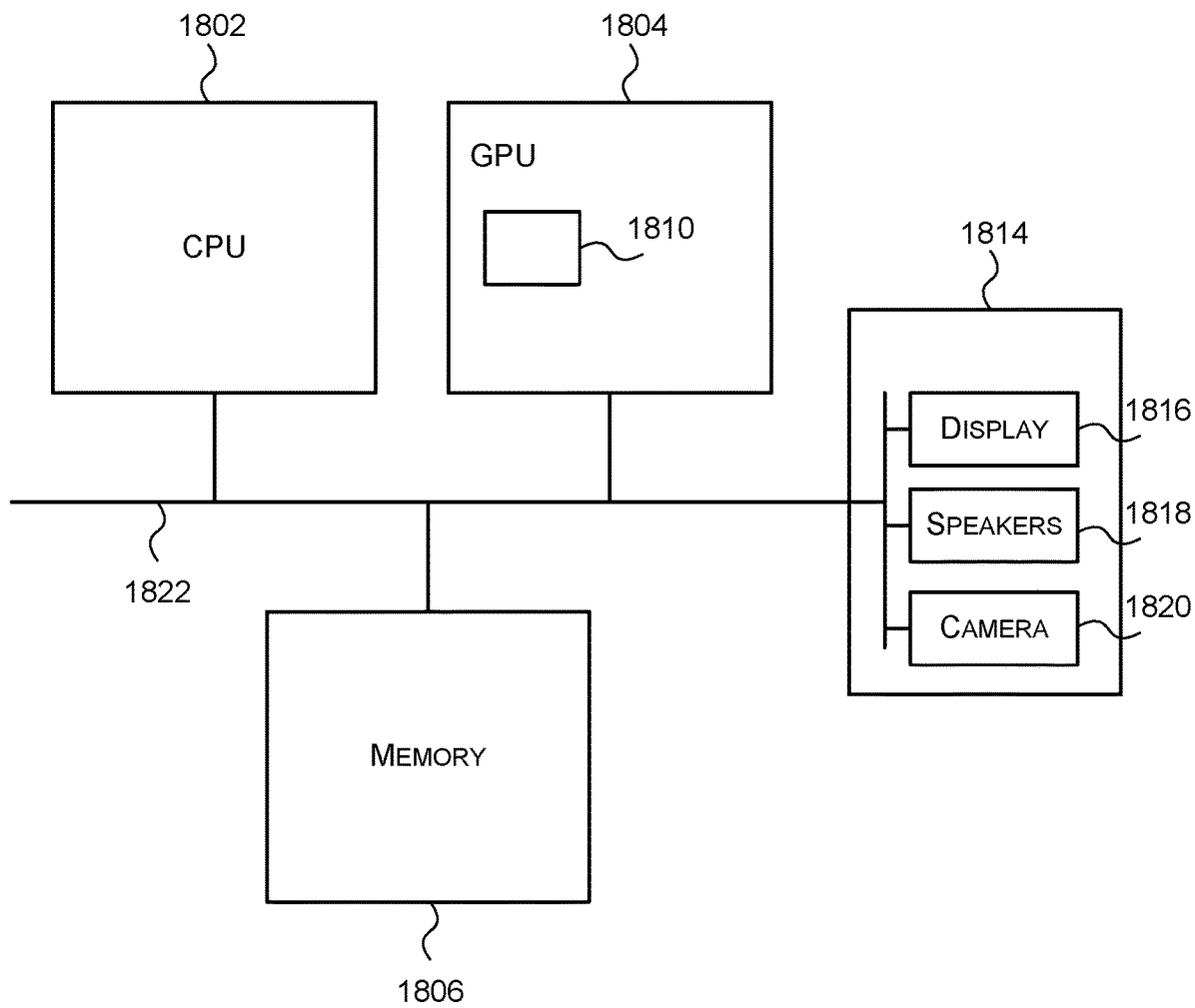
FIG. 18 is a block diagram of an example computer system in which the hardware implementation of the DNN is implemented.

FIG. 18 shows a computer system in which the hardware implementations for a DNN described herein may be implemented. The computer system comprises a CPU 1802, a GPU 1804, a memory 1806 and other devices 1814, such as a display 1816, speakers 1818 and a camera 1820. A hardware implementation of a DNN 1810 (corresponding to the hardware implementation of a DNN 1600 of FIG. 16) may be implemented on the GPU 1804, as shown in FIG. 18. In other examples, the hardware implementation of a DNN 1810 may be implemented independent from the CPU or the GPU and may have a separate connection to a communications bus 1822. In some examples, there may not be a GPU and the CPU may provide control information to the hardware implementation of a DNN 1810. The components of the computer system can communicate with each other via the communications bus 1822.

The hardware implementation of a DNN 1600 of FIG. 16 is shown as comprising a number of functional blocks. This is schematic only and is not intended to define a strict division between different logic elements of such entities. Each functional block may be provided in any suitable manner. It is to be understood that intermediate values described herein as being formed by a hardware implementation of a DNN or a processing module need not be physically generated by the hardware implementation of a DNN or the processing module at any point and may merely represent logical values which conveniently describe the processing performed by the hardware implementation of a DNN or the processing module between its input and output.

The hardware implementations of a DNN described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware implementation of a DNN described herein. An integrated circuit definition dataset may be, for example, an integrated circuit description.

Therefore, there may be provided a method of manufacturing, at an integrated circuit manufacturing system, a hardware implementation of a DNN as described herein. Furthermore, there may be provided an integrated circuit definition dataset that, when processed in an integrated circuit manufacturing system, causes the method of manufacturing a hardware implementation of a DNN to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation of a DNN will now be described with respect to FIG. 19.

Figure 19:
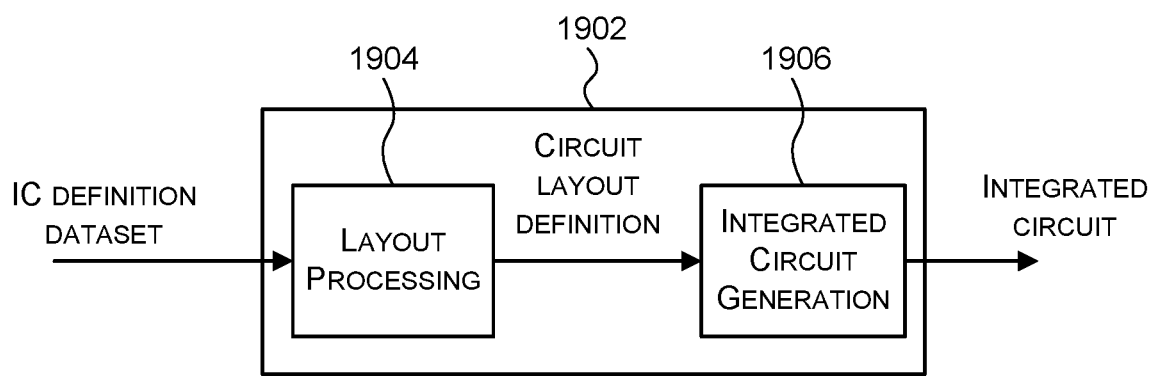
FIG. 19 is a block diagram of an example integrated circuit manufacturing system for generating an integrated circuit embodying a hardware implementation of a DNN as described herein.

FIG. 19 shows an example of an integrated circuit (IC) manufacturing system 1902 which is configured to manufacture a hardware implementation of a DNN as described in any of the examples herein. In particular, the IC manufacturing system 1902 comprises a layout processing system 1904 and an integrated circuit generation system 1906. The IC manufacturing system 1902 is configured to receive an IC definition dataset (e.g. defining a hardware implementation of a DNN as described in any of the examples herein), process the IC definition dataset, and generate an IC according to the IC definition dataset (e.g. which embodies a hardware implementation of a DNN as described in any of the examples herein). The processing of the IC definition dataset configures the IC manufacturing system 1902 to manufacture an integrated circuit embodying a hardware implementation of a DNN as described in any of the examples herein.

The layout processing system 1904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1904 has determined the circuit layout it may output a circuit layout definition to the IC generation system 1906. A circuit layout definition may be, for example, a circuit layout description.

The IC generation system 1906 generates an IC according to the circuit layout definition, as is known in the art. For example, the IC generation system 1906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1906 may be in the form of computer-readable code which the IC generation system 1906 can use to form a suitable mask for use in generating an IC.

The different processes performed by the IC manufacturing system 1902 may be implemented all in one location, e.g. by one party. Alternatively, the IC manufacturing system 1902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation of a DNN without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 19 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 19, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of identifying a fixed point number format for representing a set of values input to, or output from, a layer of a Deep Neural Network (DNN) for use in configuring a hardware implementation of the DNN, the method comprising, at one or more processors:
   obtaining a histogram that represents an expected distribution of the set of values of the layer, wherein each bin of the histogram is associated with a frequency value;
   for each fixed point number format of a plurality of fixed point number formats:
      quantising a representative value in a floating point number format for each bin according to the fixed point number format; and
      estimating a total quantisation error associated with the fixed point number format based on the frequency values and a distance value for each bin that is based on the quantisation of the representative value for that bin;
   selecting the fixed point number format of the plurality of fixed point number formats associated with the smallest estimated total quantisation error as the fixed point number format for representing the set of values of the layer; and
   configuring the hardware implementation of the DNN to process input data to the DNN in accordance with the layers of the DNN with the set of values represented in the selected fixed point number format.

2. The method of claim 1, wherein each fixed point number format of the plurality of fixed point number formats comprises an exponent and a mantissa bit-length.

3. The method of claim 2, wherein each fixed point number format of the plurality of fixed point number formats comprises the same mantissa bit-length and a different exponent.

4. The method of claim 2, wherein each fixed point number format of the plurality of fixed point number formats comprises a different mantissa bit-length and the same exponent.

5. The method of claim 1, wherein estimating the total quantisation error associated with a fixed point number format comprises determining a sum of the product of the frequency value and the distance value for each bin.

6. The method of claim 1, wherein the distance value for each bin is a difference between the representative value for that bin in the floating point number format and the representative value for that bin quantised according to the fixed point number format.

7. The method of claim 1, wherein the distance value for each bin is a squared difference between the representative value for that bin in the floating point number format and the representative value for that bin quantised according to the fixed point number format.

8. The method of claim 1, wherein the distance value for each bin is a product of a weight for the representative value of that bin and a squared difference between the representative value for that bin in the floating point number format and the representative value for that bin quantised according to the fixed point number format, wherein the weight for a representative value outside a representable range for the fixed point number format is higher than the weight for a representative value inside the representable range for the fixed point number format.

9. The method of claim 8, wherein a representative value is inside the representable range for the fixed point number format when the representative value falls between a maximum representable number in the fixed point number format and a minimum representable number in the fixed point number format.

10. The method of claim 8, wherein the weights increase linearly outside of the representable range for the fixed point number format.

11. The method of claim 1, further comprising storing the selected fixed point number format for use in configuring the hardware implementation of the DNN.

12. The method of claim 1, wherein the representative value for a bin is a centre value of the bin.

13. A non-transitory computer readable storage medium having encoded thereon computer readable instructions that, when executed at a computer system, cause the computer system to perform the method as set forth in claim 1.

14. A computing-based device for identifying a fixed point number format for representing a set of values input to, or output from, a layer of a Deep Neural Network (DNN) for use in configuring a hardware implementation of the DNN, the computing-based device comprising:
   at least one processor; and
   memory coupled to the at least one processor, the memory comprising:
      a histogram that represents an expected distribution of the set of values of the layer, wherein each bin of the histogram is associated with a frequency value; and
      computer readable code that when executed by the at least one processor causes the at least one processor to:
         for each fixed point number format of a plurality of fixed point number formats:
            quantise a representative value in a floating point format for each bin according to the fixed point number format; and
            estimate a total quantisation error associated with the fixed point number format based on the frequency values and a distance value for each bin that is based on the quantisation of the representative value for that bin;
         select the fixed point number format of the plurality of fixed point number formats associated with the smallest estimated total quantisation error as the fixed point number format for representing the set of values of the layer; and
         configure the hardware implementation of the DNN to process input data to the DNN in accordance with the layers of the DNN with the set of values represented in the selected fixed point number format.

15. A hardware implementation of a Deep Neural Network (DNN) comprising:
   hardware logic configured to:
      receive input data values to a layer of the DNN;
      receive information indicating a fixed point number format for the input data values of the layer, the fixed point number format for the input data values of the layer having been selected in accordance with a method of identifying a fixed point number format for representing a set of values input to, or output from, a layer of a DNN that comprises:
         obtaining a histogram that represents an expected distribution of the set of values of the layer, wherein each bin of the histogram is associated with a frequency value, for each fixed point number format of a plurality of fixed point number formats:
  quantising a representative value in a floating point number format for each bin according to the fixed point number format, and
  estimating a total quantisation error associated with the fixed point number format based on the frequency values and a distance value for each bin that is based on the quantisation of the representative value for that bin, and
selecting the fixed point number format of the plurality of fixed point number formats associated with the smallest estimated total quantisation error as the fixed point number format for representing the set of values of the layer;
interpret the input data values based on the fixed point number format for the input data values of the layer; and
process the interpreted input data values in accordance with the layer to generate output data values for the layer.

16. The hardware implementation of a DNN as set forth in claim 15, wherein the hardware logic is further configured to:
receive information indicating a fixed point number format for the output data values of the layer, the fixed point number format for the output data values of the layer having been selected in accordance with the method; and
convert the output data values for the layer into the fixed point number format for the output data values of the layer.

17. The hardware implementation of a DNN as set forth in claim 16, wherein the fixed point number format for the input data values of the layer is different than the fixed point number format for the output data values of the layer.

18. The hardware implementation of a DNN as set forth in claim 15, wherein the hardware logic is further configured to:
receive a set of weights for the layer;
receive information indicating a fixed point number format for the weights of the layer, the fixed point number format for the weights of the layer having been selected in accordance with the method;
interpret the weights based on the fixed point number format for the weights of the layer; and
process the interpreted input data values in accordance with the interpreted weights to generate the output data values for the layer.

19. A non-transitory computer readable storage medium having stored thereon a computer readable dataset description of the hardware implementation as set forth in claim 15 that, when processed in an integrated circuit manufacturing system, causes the integrated circuit manufacturing system to manufacture an integrated circuit embodying the hardware implementation.

* * * * *